United States Patent [19]

Minato et al.

[11] Patent Number: 5,559,621
[45] Date of Patent: Sep. 24, 1996

[54] LIQUID CRYSTAL HAVING A PLURALITY OF RECTILINEAR BARRIER MEMBERS

[75] Inventors: Takao Minato; Katsuhiro Suzuki; Hisao Hoshi; Masafumi Yoshida, all of Tokyo, Japan

[73] Assignee: Toppan Printing Co., Ltd., Tokyo, Japan

[21] Appl. No.: 277,650

[22] Filed: Jul. 20, 1994

[30] Foreign Application Priority Data

| Jul. 22, 1993 | [JP] | Japan | 5-181032 |
| Dec. 3, 1993 | [JP] | Japan | 5-303180 |
| Mar. 31, 1994 | [JP] | Japan | 6-085477 |
| Mar. 31, 1994 | [JP] | Japan | 6-085478 |

[51] Int. Cl.$^6$ .......................... G02F 1/1333; G02F 1/347
[52] U.S. Cl. .................................. 359/81; 359/56
[58] Field of Search .......................... 359/81, 56

[56] References Cited

U.S. PATENT DOCUMENTS

| 4,367,924 | 1/1983 | Clark | 350/334 |
| 4,639,089 | 1/1987 | Okada et al. | 350/341 |
| 4,682,858 | 7/1987 | Kanbe et al. | 350/334 |
| 4,720,173 | 1/1988 | Okada et al. | 350/341 |
| 5,193,021 | 3/1993 | Kim | 359/81 |
| 5,268,782 | 12/1993 | Wenz et al. | 359/81 |
| 5,367,391 | 11/1994 | Johno et al. | 359/56 |
| 5,379,139 | 1/1995 | Sato et al. | 359/81 |

FOREIGN PATENT DOCUMENTS

| 2561005 | 9/1985 | France . |
| 2569280 | 2/1986 | France . |
| 3502160 | 7/1985 | Germany . |
| 56-107216 | 8/1981 | Japan . |
| 61-182017 | 8/1986 | Japan . |
| 61-205919 | 9/1986 | Japan . |
| 61-205921 | 9/1986 | Japan . |
| 62-96925 | 5/1987 | Japan . |
| 62-118323 | 5/1987 | Japan . |

(List continued on next page.)

OTHER PUBLICATIONS

"Liquid Crystal," written and edited by Kobayashi and Okano, Baifuhkan, 1985.
"Structure and Physical Properties of Ferroeclectric Liquid Crystal," written by Fukuda and Takezone, Corona Corporation, 1990.
"Next Generation Liquid Display and Liquid Crystal Material," edited by Fukuda, CMC Corporation, 1992.
A. D. L. Chandani et al., "Antiferroelectric Chiral Smectic Phases Responsible for the Tristable Switching in MHPOBC," *Japanese Journal of Applied Physics*, vol. 28, No. 7, Jul., 1989, pp. L–1265–L–1268.

(List continued on next page.)

*Primary Examiner*—William L. Sikes
*Assistant Examiner*—Charles Miller
*Attorney, Agent, or Firm*—Burns, Doane, Swecker & Mathis, LLP

[57] ABSTRACT

According to the present invention, there is provided a liquid crystal panel frame used for a liquid crystal display which comprises a pair of opposed substrates, a pair of electrodes formed on each of those substrates, a plurality of rectilinear barrier members provided at predetermined intervals between both substrates and an orientation film formed on said substrates and being subjected to a rubbing process. Each barrier member extends in substantially parallel to the rubbing direction. By adhering each barrier member to the substrate opposed thereto, a plurality of narrowly partitioned rectilinear spaces in which portions other than an aperture formed at the end portion thereof through which the liquid crystal passes are sealed against liquid. Ferroelectric or anti-ferroelectric liquid crystals are encapsulated into each of those rectilinear spaces to form a liquid crystal panel assembly. After the encapsulated liquid crystal is held to a high temperature, that liquid crystal panel assembly is sequentially cooled down from one end of the rectilinear space toward the other end thereof under the condition in which the temperature gradient is kept appearing along the rubbing direction, to thereby obtain a defect-free orientated chiral smectic phase in the liquid crystal.

28 Claims, 21 Drawing Sheets

FOREIGN PATENT DOCUMENTS

| | | | |
|---|---|---|---|
| 63-50817 | 3/1988 | Japan . | |
| 63-135917 | 6/1988 | Japan . | |
| 63-225226 | 9/1988 | Japan ..................................... | 359/81 |
| 63-303323 | 12/1988 | Japan . | |
| 64-18126 | 1/1989 | Japan . | |
| 2-18 | 1/1990 | Japan . | |
| 4-15623 | 1/1992 | Japan ..................................... | 359/81 |
| 4-255826 | 9/1992 | Japan . | |
| 6-331970 | 12/1994 | Japan . | |
| 2157451 | 10/1985 | United Kingdom . | |
| 2164758 | 3/1986 | United Kingdom . | |

OTHER PUBLICATIONS

N. A. Clark et al., "Smectic–C 'Chevron,' a planar liquid–crystal defect: Implications for the surface–stabilized ferroelectric liquid–crystal geometry," *Physical Review A*, vol. 37, No. 3, Feb. 1, 1988, pp. 1053–1057.

Patent Abstracts Of Japan, vol. 11, No. 121(P–568) (2568) 16 Apr. 1987 & JP–A–61 267 028 (Cannon Inc), 26 Nov. 1986.

Patent Abstracts Of Japan, vol. 10, No. 341(P–517) 18 Nov. 1986 & JP–A–61 144 627 (Matsushita Electric Ind Co) 2 Jul. 1986.

M. Koden et al., "Four States of Surface–Stabilized Ferroelectric Liquid Crystal with Parallel Rubbing," *Japanese Journal of Applied Physics,* vol. 31, No. 11, Nov. 1992, pp. 3632–3635.

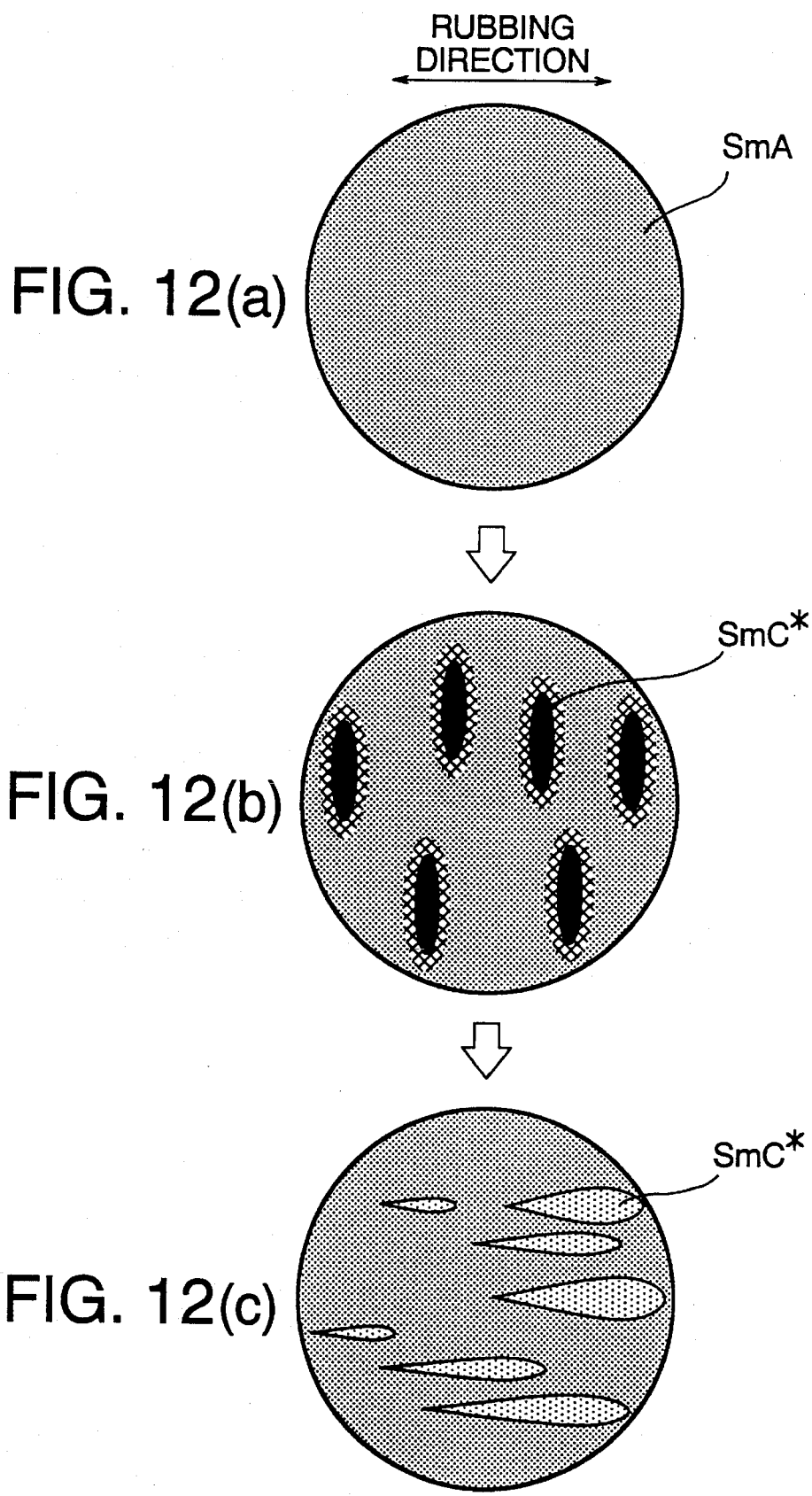

RUBBING DIRECTION

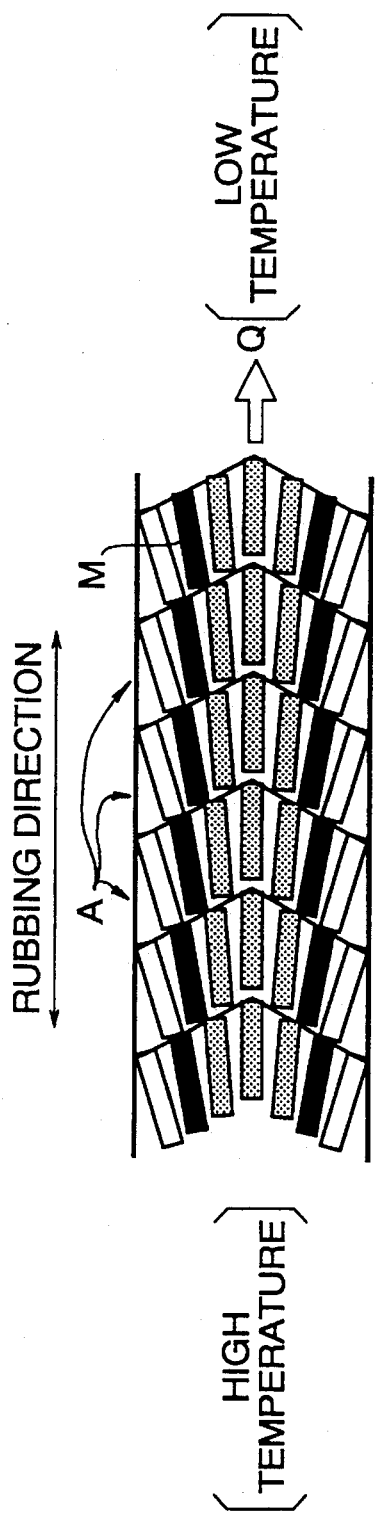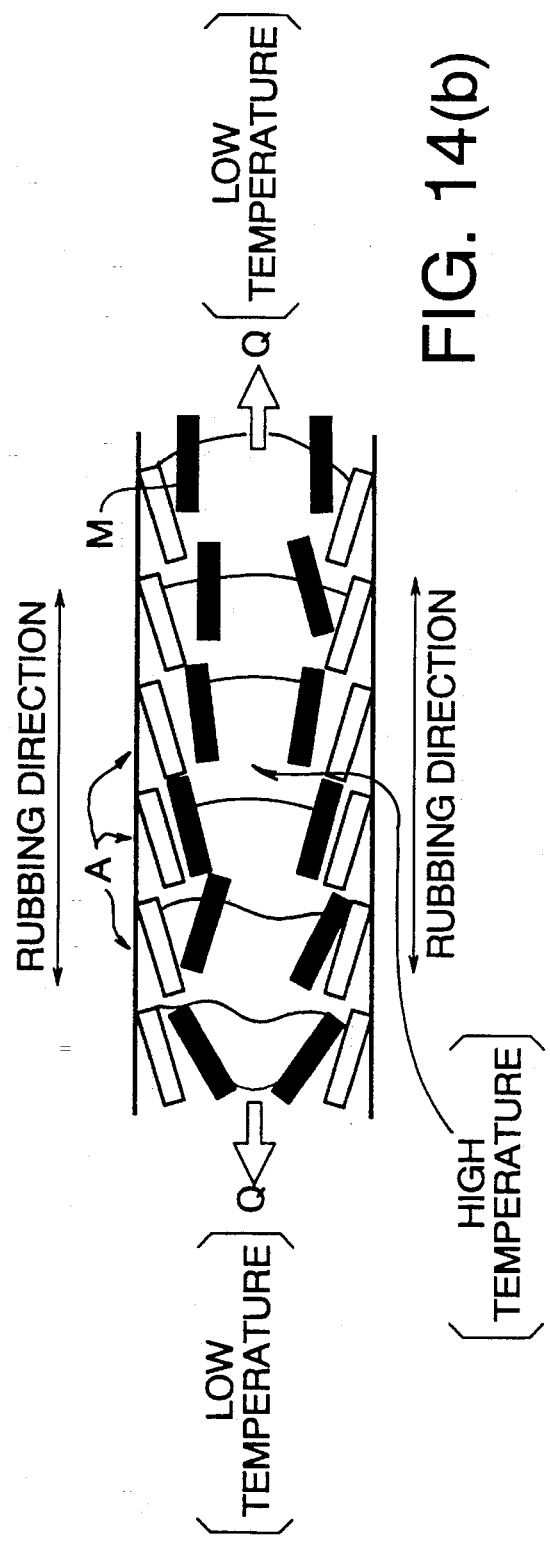

PARALLEL RUBBING
(a)

PARALLEL RUBBING
(b)

ANTI-PARALLEL RUBBING
(c)

ANTI-PARALLEL RUBBING
(d)

ONE SIDE RUBBING
(e)

ONE SIDE RUBBING
(f)

LIQUID CRYSTAL HAVING A PLURALITY OF RECTILINEAR BARRIER MEMBERS

BACKGROUND OF THE INVENTION

1. Field of the Invention

The present invention relates to a liquid crystal display used in the industrial field, office automation or domestic use and the like and, specifically, to a liquid crystal panel frame used for the liquid crystal display. Further, the present invention relates to a liquid crystal panel assembly formed by encapsulating the liquid crystal into the same liquid crystal panel frame. Still further, the present invention relates to a method and apparatus for manufacturing the same liquid crystal panel assembly. More specifically, the present invention relates to a method of controlling the alignment of liquid crystal of the liquid crystal panel assembly in which ferroelectric or anti-ferroelectric liquid crystals are used.

2. Related Art

Liquid crystal displays (LCD), which can be made of lightweight and thin materials, are widely used as displays for small size electronic calculators, measuring instruments such as a tester or the like, and for displaying graphics or characters on them for decoration or POP purposes. Recently, it is also used as a large capacity thin terminal display adapted for a television set for displaying pictures dynamically in full colors by using thin film transistors (TFT), or for a personal computer or work station.

The foregoing various displays mainly utilize shuttering performance inherent to the liquid crystal, and the typical liquid crystals exhibiting the shuttering performance include twisted nematic type liquid crystals, super twisted nematic (STN) type liquid crystals or the like utilizing nematic phase. Further, there are also available ferroelectric liquid crystals or anti-ferroelectric liquid crystals or the like utilizing chiral smectic phase. These liquid crystal are described in detail in:

(1) "Liquid Crystal" written and edited by Kobayashi and Okano, Baifuhkan, 1985;

(2) "Structure and Physical Properties of Ferroelectric Liquid Crystal" written by Fukuda and Takezoe, Corona Corporation, 1990;

(3) "Next Generation Liquid Display and Liquid Crystal Material" edited by Fukuda; CMC corporation, 1992.

The ferroelectric liquid crystal(FLC) was proposed by Clark et al (Japanese Patent Laid-Open 56-107216, U.S.P. specification No.4367924). Further, the anti-ferroelectric liquid crystal(AFLC) was found by A. D. L. Chandani et al., (Japanese Journal of Applied Physics, Vol 28, L1256 (1989). Since any of them has the so-called storage effect, it is expected that a large capacity display can be realized by driving a simple matrix addressing drive without using active elements such as thin film transistors(TFTs).

These liquid crystals exhibit complicated phase transitions such as, for example, the chiral nematic (N*) phase—the smectic A (SmA) phase—the chiral smectic Cα phase—the chiral smectic Cβ phase—the chiral smectic Cγ phase—the chiral smectic CA phase from the liquid phase, namely, the isotropic phase, which is the high temperature phase, as its temperature is lowered. Incidentally, depending on the kind of the liquid crystal, there are also phases which are not developed. For example, the anti-ferroelectric liquid crystal exhibits no chiral nematic phases. Further, the phase responsive to the electric field, which is necessary to the liquid crystal display, are chiral smectic phases which lie at the side of lower temperatures than the chiral nematic phase and are not so symmetrical with close to the crystalline state. To be more specific, with the ferroelectric liquid crystal, it is the chiral smectic C (SmC*) phase, with the anti-ferroelectric liquid crystal, it is either one of the chiral smectic CA (SmCA*) phase, the chiral smectic Cα phase, the chiral smectic Cβ phase, chiral smectic Cγ phase.

However, in order to put the display utilizing the ferroelectric liquid crystal or anti-ferroelectric liquid crystal into practical use, as also described in the foregoing literature (3), it is necessary to solve two problems simultaneously. One of them is that it is necessary to establish the method allowing a large area thin film comprising a defect-free chiral smectic phase to be mass produced, in particular, the technique for controlling the alignment of the liquid crystal. Further, the other is that it is necessary to accommodate the large area liquid crystal exhibiting a defect-free chiral smectic phase into a liquid crystal panel frame excellent in vibration- and shock-proof properties.

Conventionally, as the structure of the liquid crystal display, the method of utilizing the liquid crystal panel assembly as shown, for example, in FIG. 3 has been known. In this method, a pair of glass substrates 102, 103 provided with transparent electrodes 104, 105 is adhered to each other with a minor gap open to form a panel frame into which the liquid crystal is encapsulated. Then, a desired liquid crystal 101 is encapsulated into that minor gap to form a liquid crystal panel assembly. Further, polarizing plates 106, 106 are stuck to the liquid crystal panel assembly and, further, attachments such as driving print circuit boards or backlights and the like are packaged to form a liquid crystal display.

When the panel frame for encapsulating the liquid crystal is made, a multiplicity of spherical or cylindrical spacers 107 is disposed at one of the pair of glass substrates 102, 103, around which a seal portion 108 is printed in the form of a frame by means of screen printing or the like. Then, the other glass substrate is pressed against the foregoing glass substrate with an appropriate pressure with the spacers 107 and the seal portions 108 interleaved therebetween, and in this condition, the pair of glass substrates is entirely heated to heat and harden the seal portions 108 to adhere both of them.

Laminated on each of the opposed glass substrates 102, 103 are transparent electrodes 104, 105, an insulating film, a color filter and the like, as necessary. Further, on the uppermost portion contacting the liquid crystal, an organic film, for example, a polyimide film 109, 110 subjected to the uniaxial alignment treatment for orientating that liquid crystal, for example, a rubbing process, is formed. The width of the minor gap, that is, the cell gap is set to a desired value ranging from 1 to 10 μm depending on the kind of the encapsulated liquid crystal. In particular, as regards the ferroelectric liquid crystal(FLC) or anti-ferroelectric liquid crystal(AFLC), the cell gap is set to 1 through 3 μm, and more preferably, 1.5 through 2 μm.

The encapsulation of the liquid crystal into the panel frame is carried out, for example, in the following manner. First, the panel frame is set within an evacuating apparatus and, after the interior of the panel frame is evacuated through an aperture portion, the aperture portion is blocked with the liquid crystal to be encapsulated. Thereafter, atmospheric air is introduced into the evacuating apertures to apply a differential pressure to the liquid crystal at the aperture portion to make that liquid crystal penetrate into the panel frame. The penetrating speed can be controlled by the pressure difference. The slowest speed is achieved when it is made to penetrate only with surface tension without applying the pressure difference. Incidentally, the interior of the liquid crystal panel frame shown in FIG. 3 constitutes a single continuous space without any partition, and if the liquid crystal penetrates through that internal space, then it can penetrate anywhere therein.

The penetrating temperature is one corresponding to the liquid phase of the liquid crystal to be encapsulated, and, with the ferroelectric liquid crystal or anti-ferroelectric liquid crystal, it will be on the order of 80° C. to 120° C. Thereafter, if the aperture portion is sealed and the liquid crystal is cooled again from the high temperature in a temperature controlled oven, then it follows phase transitions, such as the liquid phase—the chiral nematic phase—the smectic A phase—the chiral smectic C phase, to achieve a liquid crystal panel assembly having an aligned chiral smectic phase.

With this arrangement, since the upper and lower substrates 102, 103 are not adhered to each other at the positions other than the seal portions 108, if being locally pressed, gradual unevenness is occurred in substrates 102, 103, and thereby, the liquid crystal 101 within the liquid crystal panel assembly fluidizes. If the liquid crystal lies in the nematic phase, since the nematic phase is close to the liquid state, even if such a liquid crystal fluidization takes place, by releasing the pressure, the alignment of the liquid crystal is returned to the original order, so that no problem occurs. When the liquid crystal display incorporating the liquid crystal panel assembly is carried as a portable type or is used in the office on a daily basis, if a certain shock or physical stress is applied to the substrate, then the substrate is slightly deformed, but if they are released, it is returned to the original condition reversibly without causing any problem.

On the other hand, if the ferroelectric liquid crystal or anti-ferroelectric liquid crystal is encapsulated into the liquid crystal panel frame of this type of arrangement, and similarly, the substrate is deformed due to local pressure or impact, then the liquid crystal therein will fluidize. Since the ferroelectric liquid crystal or the like typically has a layered structure inherent to the smectic phase as shown in FIG. 7, once fluidization takes place to this, zigzag defects or turbulences will occur to the inherent layered structure, and these turbulences will never be eliminated. In this case, it will be necessary to heat the liquid crystal layers again to the isotropic phase and to cool down further for reorientation, but such an operation will be practically impossible. In order to prevent the turbulences of the liquid crystal layers, also in the process of packaging the attachments after its alignment is controlled, it is necessary to pay careful attention to their handling so that no shock or vibration is applied to the liquid crystal panel assembly, and further, some special devices such as shock absorbent material or panel surface protection member will become necessary also as the liquid crystal display. However, these will entail the reduction of productivity or increase of cost, thus narrowing the utilizing scope as the liquid crystal display.

In consequence, if the liquid crystal such as especially the ferroelectric liquid crystal is used, then it is necessary to use the panel frame excellent in vibration- and shock-proof properties which cannot cause excessive fluidization to the liquid crystal therein even if the substrate is pressed or suffers a shock. As a method which allows such a panel structure to be achieved, one in which the pair of substrates is firmly adhered to each other is publicly known. In the case where the displaying portion has an area more than 210 mm×295 mm (that is, A4 size), unless both substrates are adhered, any shape of spacer member can not practically employed because separation is occurred between both substrates when the alignment treatment being carried out, attachments being mounted on the panel assembly and the liquid crystal display being used in practice.

In the conventional type arrangement shown in FIG. 3, a technique in which adherent beads (that is, spherical pieces) are dispersed between both substrates to adhere them is disclosed in Japanese Patent Laid-Open 64-18126. Further, techniques in which a dot-shaped (that is, columnar) adherent member is formed on one of the substrates by photolithography to adhere both substrates more flexibly and stiffly are disclosed in Japanese Patent Laid-Opens 63-50817, 62-96925, 62-118323, 4-255826 and the like. Further, techniques in which a stripe-shaped adherent member is used are disclosed in Japanese Patent Laid-Opens 63-50817 and 63-135917 and the like.

The aim of adhering in the foregoing prior art is to retain the gap between the upper and lower substrates constant, or to dispose the spacers at positions corresponding to the non-pixel portion, and it is not allowed for therein that especially important matters with the present invention, that is, (1) how to penetrate the liquid crystal into the liquid crystal panel frame is specified, (2) the direction in which the volume of the liquid crystal contracts attended with cooling down is specified, (3) the direction in which the chiral smectic phase layer grows is controlled. As will be described later, for the substrates adhered in the dot-shaped manner, or using beads, it is impossible to achieve a defect-free chiral smectic phase. As regards ones using the stripe-shaped adherent member, there will be chances of getting the less defective chiral smectic phase, but it will be insufficient to merely adhere the substrates in the stripe-shaped manner.

Next, the initial alignment of the ferroelectric liquid crystal for a liquid crystal panel assembly in which both substrates are adhered by the adherent member and for one retaining the gap between both substrates simply by beads in place of using the adherent member is hereinafter described briefly. These liquid crystal panel assemblies have the cell gap (that is, the gap between the substrates) of about 2 μm or less, and is subjected to a normal rubbing process. Further, these liquid crystal panel assemblies are cooled down in the oven or liquid after being penetrated with the ferroelectric liquid crystal.

Within layers of the SmC* phase obtained by cooling down the ferroelectric liquid crystal from the phase in the high temperature condition, some inherent abnormal alignment never fail to be found. These abnormal alignment include loop-shaped and line-shaped zigzag defects (as indicated by the numeral 113 of FIG. 4), tree-shaped defects generating at the portions where adjacent crystalline phase domains strike against each other (as indicated by the numeral 114 of FIG. 5), quasi-linear type defects (as indicated by the numeral 115 of FIG. 6) or the like. The crystalline phase domain means the smectic A phase which appears in the isotropic phase or the chiral nematic phase, and the chiral smectic C phase or anti-ferroelectric phase which appear in the smectic A phase.

When a non-adherent type spacer is dispersed between both substrates, or a dot-shaped spacer is randomly disposed to adhere both substrates to each other, loop-shaped zigzag defects are often found and, sometimes, the tree-shaped defects are found. Further, as shown in FIG. 27, when dot-shaped fine spacers 107 were regularly disposed to adhere both substrates, zigzag defects 116 running in synchronism with the cycle of the regularity of the spacers 107 were generated. Even if the non-adhere stripe-shaped spacers were used, a multiplicity of similar zigzag defects generated.

When both substrates are adhered by means of the stripe-shaped spacers, large zigzag defects which divide the panel surface into two or three are found and, further, a multiplicity of rectilinear or tree-shaped alignment defects are also found therein. In other words, it means that, if both substrates are adhered by means of the stripe-shaped spacers, although the amount of generated zigzag defects becomes small, such an adhesion is not enough to completely eliminate them. Further in this case, if the liquid crystal panel assembly is rapidly cooled down, narrow empty gaps which is caused by the liquid crystal layers contracting in the opposite directions are found between the adjacent stripe-shaped spacers.

If the alignment defect such as the zigzag defect or the like is present on the electrode one at all, then it is difficult to serve the liquid crystal panel assembly for practical purpose because when the refractive index relative to the rectilinear polarization differs even a little at both sides of zigzag defects, a slight shading is generated, or when the liquid crystal display is driven, the defects themselves constantly flicker and further new defects are likely to occur. This is also the case even when the empty gap takes place.

The structure of the zigzag defects and several methods to eliminate them are described in the foregoing document (3), in which the zigzag defects are considered to occur necessarily because the SmC* phase exhibits the chevron structure shown in FIG. 7. This chevron structure refers to a phenomenon in which the liquid crystal layer S of chiral smectic phase is bent in the shape of "<<". This bending direction is not uniquely determined, but there are two types, one 111 in which the liquid crystal layer directs in the leftward direction as viewed in Figure, and the other 112 in which the liquid crystal directs in the rightward direction, and the zigzag defect 113 occurs between each boundary. As illustrated in FIG. 8, if the liquid crystal layer S of chiral smectic phase takes an ideal bookshelf structure, then it is considered that the domain-shaped zigzag defects do not happen. However, even in this case, there is a chance that the tree-shaped or linear defects are developed. Incidentally, referring to FIGS. 7 and 8, the sign "K" denotes the boundary between the substrates and the liquid crystal layer.

In order to eliminate the zigzag defects, a method of fixing the bending direction of the liquid crystal layer of the chevron structure has conventionally been known as follows.

(1) The method in which a pretilt angle is enlarged. That is, the axis of the liquid crystal molecule within the liquid crystal is previously tilted at a finite angle relative to the substrates, rather than being located in parallel to them. ("Next Generation Liquid Crystal Display and Liquid Crystal Material", edited under the supervision of Fukuda, page 85, CMC Corporation, 1992)

(2) A suitable liquid crystal material is used and, further, the combination of the orientation film and the rubbing direction is made suitable (ibid, page 19), or (3) A ferroelectric liquid crystal material which is less in the folding degree of the liquid crystal layer (that is, the reduction of the spacing between the smectic phase layers) at the phase transition from the smectic A phase into the SmC* phase is used (ibid, page 37).

However, in the method of (1), the oblique vapor deposition process is adopted, and it takes practically no effect for the alignment control with a large area liquid crystal display having an area more than 181 mm×256 mm (that is, B5 size). Further, the processes of (2) and (3) are effective only for specific materials, and cannot be universally applied to every material. In further addition, if the bending directions of the liquid crystal layers should be successfully controlled in a one direction according to each of the foregoing processes, it is not clear for us to also eliminate the defects caused by the collision of the liquid crystal phase domains which generate at different locations in the cooling process of the liquid crystal, or defects caused by the contraction of the volume of the liquid crystal.

As an alternative to the foregoing, another method is proposed in Japanese Patent Laid-Open 2-18 by the applicant in which, after the layers of the SmC* phase is formed, the generated zigzag defects are locally heated and, further, with the same heating area shifted, are expelled from the effective display area. However, this attempt is to remove the zigzag defects after the smectic layers are formed, and does not achieve smectic layers which are defect free from the very beginning, as in the present invention.

As a further alternative, an example in which the liquid crystal panel assembly encapsulated with liquid crystal is cooled down along the rubbing direction is disclosed in Japanese Patent Laid-Open 61-182017. This is intended to improve the alignment performance of the nematic phase of a hybrid type nematic liquid crystal which is subjected to a parallel alignment process on one side and to a vertical alignment process on the other side, and differs from the crystal growth of the chiral smectic phase, to which the present invention is directed.

In the techniques disclosed in the foregoing Japanese Patent Laid-Opens 2-18 and 61-182017, the interior of the panel frame to be encapsulated with the liquid crystal constitutes a single space free of any partition, and hence, the desired defect free chiral smectic phase cannot be achieved by any means.

As a still further alternative, there have been known a method in which less defective layers of the chiral smectic phase are induced, by shifting the temperature gradient, onto the electrode with the crystalline cross-section of PET (polyethylene terephthalate) film as the starting point (see, for example, "Structure and Physical Properties of Ferroelectric Liquid Crystal" written by Fukuda and Takemori; Corona Corporation, 1990 page 234). However, this process does not have in mind at all that the uniaxial alignment process, for example, the rubbing process is carried out by using the orientation film, so that it cannot be used for reference if one tries to obtain the defect-free chiral smectic phase by using the rubbing process. In practice, such a conventional method cannot be applied at all to the large area liquid crystal panel assembly, to which the present invention is directed.

On the other hand, the anti-ferroelectric liquid crystal differs from the ferroelectric liquid crystal in that the smectic A (SmA) phase directly precipitates from the isotropic phase, that is, nucleation happens because the anti-ferroelectric liquid crystal does not have the chiral nematic phase. The alignment defects can be visually observed when the phase changes from the isotropic phase to the smectic A (SmA) phase, and when it undergoes from the SmA phase to the anti-ferroelectric phase, for example, the SmCA* phase. The defects observed as the phase changes from the SmA phase to the SmCA* phase are similar to those for the ferroelectric liquid crystal.

When the smectic phase A (SmA) phase precipitates from the isotropic phase, although it precipitates first growing in parallel to the rubbing direction, generally, it precipitates spreading at the same or slightly slower speed also in the direction perpendicular to the rubbing direction. The alignment defects observed at this time are as follows.

(1) They occur at the portions where the SmA phase domains which have grown at different locations strike against each other (see sign X of FIG. 9).

(2) They are the domains which grow fast in some angular direction relative to the rubbing direction at the portions where the orientating direction slightly differs from that of the perimeter surrounding the domain (see sign Y of FIG. 10).

(3) They can often occur at the portions where the liquid crystal snakes and where the directions in which the smectic phase layers greatly differ (see sign Z of FIG. 11).

The defects as in (1) take the form of laces extending in the substantially perpendicular direction relative to the rubbing direction, the laces being small but large in number. The reason why the defects of (2) develop is unknown, but they are large inters of area.

Although the defects of (1) and (3) are similar, their magnitudes of deviation differ. With reference to the defects of (1), the directions in which the layers of both domains run with respect to the defects are basically the same because they are define in the rubbing direction. Further, these defects, since formed due to the growth of both domains from different directions, deviate slightly. These defects remain as such also in the low temperature phase of the liquid crystal, for example, the anti-ferroelectric phase.

With reference to the defects of (1) and the alignment defects of the ferroelectric liquid crystal, it is shown in, for example, Japanese Patent Laid-Open 63-303323 that, if those defects are small in number, they can be removed by supplying rectangular electrical waves of about 100 through 300 Hz for several hours. However, such a technique utilizing the electric field is not also practical.

As described above, conventionally, a technique which can make to grow mono-domain layers constituted with defect free chiral smectic phase based on a certain sort of law has not been known. That is, when the liquid crystal panel assembly is made by utilizing the conventional alignment controlling method, at least one of the zigzag defects, tree-like alignment defects and linear alignment defects will necessarily be generated over large layers of the chiral smectic phase.

SUMMARY OF THE INVENTION (Objects of the Invention)

Accordingly, an object of the present invention is to provide a liquid crystal panel frame which is excellent in vibration- and shock-proof properties while making the liquid crystal penetrate in a stable condition without generating the turbulence or distortion of the liquid crystal.

Another object of the present invention is to provide a liquid crystal panel assembly which is excellent in vibration- and shock-proof properties while accommodating the stable liquid crystal which contains no turbulence or distortion.

A further object of the present invention is to provide a panel assembly structure which can completely remove the alignment defects which have conventionally been generated in the liquid crystal cooling process.

A Still further object of the present invention is to provide a method of manufacturing a liquid crystal panel assembly which can completely remove various alignment defects such as zigzag defects, which would necessarily generate according to the conventional method of manufacturing the liquid crystal panel assembly.

Yet another object of the present invention is to provide an apparatus for manufacturing a liquid crystal panel assembly which is easy to manufacture and yet which is high in productivity and industrially useful.

Features of the Invention

In order to achieve the foregoing objects, a liquid crystal panel frame according to the present invention comprises a pair of substrates at lest one of which is transparent, a pair of electrodes which is formed on said substrates opposed to each other, a plurality of rectilinear barrier members arrayed in parallel between both substrates at predetermined intervals, and an orientation film which is formed on at least one of the pair of substrates and which is subjected to uniaxial alignment treatment. Each barrier member runs substantially in parallel to the direction in which the orientation film is subjected to the uniaxial alignment treatment, and is adhered to the opposed substrate to form a rectilinear space with the portions other than the aperture end portions through which the liquid crystal passes sealed against the liquid.

Further, the liquid crystal panel assembly according to the present invention may be formed by encapsulating the ferroelectric or anti-ferroelectric liquid crystal into each rectilinear space of the liquid crystal panel frame.

The foregoing uniaxial alignment treatment refers to one conducted in order to align the liquid crystal molecules in certain constant directions, and rubbing process, oblique vapor deposition process and the like are conceivable. Further, as the pair of electrodes, stripe-shaped electrodes in which a plurality of rectilinear electrodes is arrayed in parallel at a predetermined interval, or a planar electrode formed as a single plane can be used. Preferably, the length of the rectilinear space is longer than that of the area used as the display portion of the liquid crystal display.

The rectilinear space surrounded by the barrier member and the electrodes is preferably formed by applying a high molecular organic substance film or the like on its inner wall surface. Thus, since the inner wall surface of the rectilinear space which contacts the liquid crystal becomes chemically uniform, the liquid crystal volume can uniformly be changed as it is cooled down, and the generation of the defects can be reduced. As the high molecular organic substance film, for example, polyimide, polyamide, polyvinyl alcohol or the like can be used. Further, as the method of forming the high molecular organic substance film, a known method of forming the film such as, for example, spin coating, roll coating and the like may be adopted.

The aperture for introducing the liquid crystal into the liquid crystal panel frame may be provided anywhere at the liquid crystal panel frame, but preferably, is provided at the side of the aperture of the end of the rectilinear space. In this way, as compared with the case where the liquid crystal is introduced from the side of the barrier member, the time period required for the liquid crystal to penetrate into the liquid crystal panel frame can be reduced.

The inventor has reviewed the length of the rectilinear space and the width of that end aperture. The result is descried with reference to FIG. 28. Although the width "L" of the rectilinear space "R" is determined by the distance between each barrier member 8, in view of the fact that the barrier member 8 also serves as a light insulating layer, and from the point of the frequency with which the liquid crystal phase domain occurs, adhering strength of the barrier member 8 relative to the substrate or the rigidity relative to the pressure applied to the substrate, it is ideal to disposed those barrier members 8 all between each strip-shaped electrode. If the planer electrode is used, the interval at which the barrier members 8 are disposed are not relative to the intervals at which the electrodes are disposed, as in the case of the stripe-shaped electrode, but appropriate intervals are selected according to the foregoing viewpoints.

If the width "L" of the end aperture of the rectilinear space "R" is set wide, then the distance L1 over which the liquid crystal introduced from the aperture 10 enters the rectilinear space "R" until it reaches a constant flowrate can become long. Over this distance L1, there is a high possibility that the alignment defects of the liquid crystal generate, and it cannot be used as the display portion. Generally, since the liquid crystal flow becomes turbulent in the neighborhood of the inlet and outlet of the rectilinear space "R" through which the liquid crystal flows, it was necessary to make the length of the rectilinear space "R" longer by more than 10 mm at one end portion thereof than that of the area used as the display portion. Further, when the liquid crystal panel assembly is cooled down, in order to completely apply the temperature gradient to the surface of that liquid crystal panel assembly, the liquid crystal panel assembly which is too short in the length of the rectilinear space "R" is no preferable. In view of the foregoing, the length of the rectilinear space R is preferably set to 10 cm or more, and further, the width L of the aperture portion is preferably set to below 2 mm or less.

With reference to the positional relationship between the aperture 10 for encapsulating liquid crystal and the rectilinear space "R", the barrier member 8 immediately adjacent to the aperture 10 is preferably formed to form a rectilinear space "R". However, in that case, it is necessary to widen the aperture 10, so that it can become difficult to seal the liquid crystal panel assembly. At the same time, since the upper and lower substrates are adhered in the neighborhood of the aperture 10 not by the adhesion by the seal portion, but only by the rectilinear barrier member 8, another problem can also arise that the adhering force becomes deficient. In consequence, it is necessary to suppress the size of the aperture 10 somewhat small and to provide a certain distance between the aperture 10 and inlet/outlet of the liquid crystal of the rectilinear space "R" in order to widen the flow of the liquid crystal.

With reference to the position where the aperture 10 is provided, as shown in FIG. 2, it is preferable to provide it at the side of the inlet/outlet of the liquid crystal of the rectilinear space "R". In this way, as compared with the case where the aperture 10 is provided at the lateral portion of the rectilinear space "R", that is, the barrier member 8, the liquid crystal can be introduced into the rectilinear space "R" without causing the turbulence.

Further, as shown in FIG. 29, a taper portion "T" which is thinned outwardly is preferably provided at the end portion of the inlet/outlet side of the barrier member 8. In this way, the distance L2 over which the turbulence is caused to the flow of the liquid crystal in the neighborhood of the inlet/outlet of each rectilinear space "R" can be reduced with the result that the generation of the alignment defects of the liquid crystal can be prevented over a wider range.

It is difficult to evenly seal the upper and lower substrates by mechanical press treatment, and is preferable to press both substrates by utilizing the atmospheric pressure. If, in this manner, both substrates are heated utilizing the atmospheric air, both substrates can completely be adhered. In this case, if the rigidity of the barrier member which retains the gap between both substrates is insufficient, then the barrier member can often collapse. In contrast, when the barrier member is formed, if any particulate the diameter of which are the same as the cell gap, or are smaller than that, and yet rigid, are previously dispersed thereon and contained through the resist, the rigidity of the barrier member can be improved and its collapse can be prevented.

The step to form the barrier member is not restricted to photolithography, but a highly precise printing technique is also applicable. Also, the adhering process is not restricted to heating, but the ultraviolet rays hardening process or the like is also conceivable. Further, a black series coloring material is preferably dispersed on the barrier member. In this way, since the barrier member efficiently works as the light insulating member, when the image is displayed by means of the liquid crystal panel assembly, a high quality image which is high in contrast can be obtained.

The phase of the ferroelectric liquid crystal which is accommodated within the liquid crystal panel assembly is set to, for example, the chiral smectic C phase. Further, the phase of the anti-ferroelectric liquid crystal is either one of the chiral smectic CA phase, chiral smectic $C\alpha$ phase, chiral smectic $C\beta$ phase and chiral smectic $C\gamma$ phase.

By the way, the liquid crystal display designated by the numeral 15 in FIG. 30 is normally prepared by incorporating attachments such as, for example, a printed circuit board 20 disposing TFTs(Thin Film Transistors), a backlight 11, upper and lower frames 12a, 12b and the like. Further, a display device 16 illustrated for example in FIG. 31 is made by using the liquid crystal display 15, and is utilized, for example, as output device for computer system. The displaying device 16 comprises a supporting stand 13 and a rectangular frame 14 supported by the supporting stand 13. The liquid crystal display 15 is disposed around the center portion of the frame 14. With reference to the displaying device 16, barrier members 8 formed in the liquid crystal panel assembly 1 are preferably positioned in the horizontal direction.

If the area of the liquid crystal panel assembly becomes large, when it is erected vertically, a major load will be imposed on the underlying liquid crystal by the weight of the overlying liquid crystal. Unless any measure is taken, the alignment of the underlying liquid crystal can be destroyed by the action of the load to cause the abnormal orientation. On the contrary, if the barrier member 8 is disposed in the horizontal direction, as in FIG. 31, then the load of each liquid crystal will be beard by each barrier member 8, and the generation of the abnormal alignment within the liquid crystal can be prevented.

In order to achieve the foregoing object, the method of manufacturing the liquid crystal panel assembly according to the present invention comprises steps of:

(1) forming an orientation film on at least one of a pair of substrates opposed to each other;

(2) applying a uniaxial alignment treatment to at least one of said orientation films;

(3) forming a plurality of rectilinear spaces continuously in parallel between said substrates so as to extend in substantially parallel to the direction of said uniaxial alignment treatment, the rectilinear spaces each having an aperture at least one end portion, portions other than said aperture being sealed against liquid; and (4) encapsulating a ferroelectric liquid crystal or an anti-ferroelectric liquid crystal into those rectilinear spaces;

(5) retaining the encapsulated liquid crystal to a temperature presenting a high temperature phase; and (6) thereafter, sequentially cooling the encapsulated liquid crystal from one end portion of the rectilinear space to the other from a temperature presenting the high temperature phase down to a low temperature phase under the condition in which the temperature gradient is kept appearing along the direction of the uniaxial alignment treatment.

The cross-sectional form of the foregoing rectilinear space is not restricted to a specific configuration and area but, preferably, a flat substantial quadrangle, the area of which is set to 0.006 mm² or less. Further, the length of the rectilinear space is not also restricted to a specific one but, preferably, to 10 cm or more.

As a more specific method of manufacturing the foregoing liquid crystal panel frame, the following method can be adopted, in which (1) a stripe-shaped electrode in which a plurality of rectilinear electrodes is arrayed at predetermined intervals is formed on a pair of substrates, (2) an orientation film is formed on one or both of the stripe-shaped electrodes on each substrate, (3) uniaxial alignment treatment is applied to at least one of the orientation films, (4) rectilinear barrier members are formed between each rectilinear electrode of the stripe-shaped electrodes of the one of the substrates at the same intervals as those for the electrodes or at plural intervals so as to extend in substantially parallel to the direction of the uniaxial treatment, and (5) after those substrate are opposed so that the stripe-shaped electrodes lying on the pair of substrates intersect at a right angle with each other, the barrier member formed on one substrate is adhered on the other substrate to form a rectilinear Space sealed against liquid.

Further, in a method of manufacturing a liquid crystal panel frame using the planar electrodes in place of the stripe-shaped electrodes, (1) planar electrodes are formed on a pair of substrates, (2) an orientation film is formed on one or both of the planar electrodes on each substrate, (3) uniaxial alignment treatment is applied to at last one of the orientation film, (4) barrier members are formed at desired intervals on the planar electrode formed on the one substrate so as to extend in substantially parallel to the direction of the uniaxial alignment treatment, and (5) the barrier member formed on the one substrate is adhered to the other substrate to form a rectilinear space sealed against the liquid.

The high temperature phase referred to in the foregoing method may be either one of the isotropic phase, chiral nematic phase, and chiral smectic A phase. Further, the low temperature phase may be the chiral smectic C phase, or anti-ferroelectric liquid crystal phase.

Further, an apparatus for manufacturing a liquid crystal panel assembly according to the present invention is intended to manufacture a following liquid crystal panel assembly, in which (1) a plurality of rectilinear spaces is continuously formed in parallel between a pair of substrates opposed to each other, the rectilinear spaces having an aperture at least one end portion thereof and portions other than the aperture which are sealed against liquid, (2) an orientation film is formed on at least one of the pair of substrates, (3) uniaxial alignment treatment is applied to at least one of the orientation films in substantially parallel to the direction in which the rectilinear space is extend, and (4) a ferroelectric or anti-ferroelectric liquid crystal is encapsulated into those rectilinear spaces, and is specifically intended to form a mono-domain layer in low temperature phase into the encapsulated liquid crystal. This apparatus features that it comprises a high temperature portion having a temperature at which the encapsulated liquid crystal exhibits a high temperature phase, a low temperature portion at which the encapsulated liquid crystal has a temperature exhibiting a low temperature phase and a liquid crystal panel shifting means for relatively shifting the temperature gradient against the liquid crystal panel assembly from one end portion of the rectilinear space toward the other end portion of the same under the condition in which the temperature gradient is kept appearing along the direction of the uniaxial alignment treatment. The liquid crystal panel shifting means can shift either the liquid crystal panel assembly, heat sources or both of them.

In the foregoing apparatus, in order to apply the temperature gradient to the liquid crystal panel assembly more effectively, it is desirable to provide a heat insulating member between the high and low temperature portions. Further, the high and low temperature portions may be arranged with either one of gaseous atmosphere, liquid atmosphere or solid substance, the last one of which means a Pertie element or other heat evolving solid substances.

Further, a more specific arrangement of the liquid crystal panel assembly comprises a liquid area acting as the high temperature portion, an atmospheric area acting as the low temperature, an gas-liquid interface shifting means for relatively shifting the gas-liquid interface between the liquid area and the atmospheric area relative to the liquid crystal panel assembly immersed in the liquid area and a heat insulating member which can shift following the liquid surface of the liquid area and having a slit through which the liquid crystal panel assembly passes.

(Plain Description about the Liquid Crystal Panel and Method of Cooling the Same)

The present invention relates to a liquid crystal panel frame and liquid crystal panel assembly having a specific structure and, the method of manufacturing the liquid crystal panel assembly according to the present invention subsists with inseparable requirements that a specific cooling process is applied to that liquid crystal panel assembly of specific structure. To be more specific, they are as follows.

The liquid crystal panel frame or liquid crystal panel assembly, to which the present invention is directed, has a structure as shown in, for example, FIG. 1. When this liquid crystal panel frame and the like are viewed from above, they have a structure as shown in FIG. 2. Referring to FIG. 1, between striped transparent electrodes 5 formed on one of the glass substrates 3, a rectilinear barrier member 8 having a thickness corresponding to the cell gap G is formed. Another glass substrate 2 is adhered to the barrier member 8 by means of an appropriate means to thereby form a liquid crystal panel frame for encapsulating liquid crystal in which a pair of substrates is completely adhered and in which the cell gap G is precisely defined.

Numerals 9 and 7 each denote a polyimide orientation film. The numeral 4 denotes an opposed transparent electrode opposed to one of the transparent electrodes 5 to extend at a right angle thereto in the striped form. The numeral 6 denotes an insulating film. A color filter may be provided below either one of the transparent electrodes. With this arrangement, a rectilinear space "R" may be formed between each barrier member 8. A liquid crystal panel assembly 1 is formed by encapsulating a ferroelectric or anti-ferroelectric liquid crystal into these spaces "R".

The rectilinear spaces "R" lying on the stripe-shaped electrodes 5 are each separated by means of the barrier members 8, and forms a completely closed space as seen in FIG. 2, except for the aperture portions of the top end portion 22 and the rear end portion 23. That is, the portions other than the aperture are sealed against liquid. The rear end portion 23 can also be closed adhered to a seal portion 21. The cross-sectional form of the rectilinear space R will be a flat quadrangle, i.e., a rectangle. In this case, the minimum width of the long side L of the rectangle may automatically be set to substantially equal the line width of the stripe-shaped electrode 5, for example, about 50 through 500 μm. The short side S of the rectangle may be set to equal the cell gap G, for example, 1 through 3 μm. The cross-sectional form of the rectilinear space R cannot strictly become a perfect quadrangle due to the steps caused by the difference between the thicknesses of the transparent electrodes 5, more or less convex and concave portions presented on the surface of the transparent electrode 5, flexure on the lateral surface of the barrier member 8, roundness at four corners or the like.

The width "W" of the barrier member 8 which serves as the barrier for separating the rectilinear spaces R is set to below the distance between two adjacent electrodes 5, for example, 10 through 100 μm. The length LR of the rectilinear space R(FIG. 2) is set longer than that of the electrode acting as the display portion D, for example, 10 through 40 cm. This is because the abnormal alignment "E" is visible at the inlet/outlet of the liquid crystal over the length LE or LX which is on the order of 5 through 10 mm. A specific method of forming such a rectilinear space "R" on the substrate continuously is disclosed in Japanese Patent Laid-Open 62-96925 by the applicant.

Uniaxial alignment treatment is applied to the inner wall of the space "R" in substantially parallel to the direction in which the rectilinear space "R" extends. As the uniaxial alignment treatment, the rubbing process, oblique vapor deposition process or the like may be used, but if the panel assembly of interest is large area one, the rubbing process is preferable in view of productivity and alignment capability. There are four surfaces contacting the liquid crystal. This rubbing process is applied without any interruption to at least one of the two wide surfaces P1 and P2 (FIG. 1) forming the rectilinear space, which constitutes a passageway for the liquid crystal. It is true that the rubbing process is not impossible for the two surfaces P3 and P4 opposed thereto at a right angle, but these surfaces alone are not enough to obtain a sufficient alignment of the crystal molecules.

When aligning capability is put to the opposed two surfaces P1 and P2, the method of aligning the rubbing directions may be selected from either one of the parallel rubbing method and anti-parallel rubbing method. Parallel rubbing method refers to the case in which the rubbing directions of the two surfaces P1 and P2 are aligned in the same direction, and anti-parallel rubbing method refers to a case in which the rubbing directions of the two surfaces P1 and P2 are set in the reverse directions. However, if necessary, they may be opposed to each other at a certain angle without aligning the rubbing directions completely. In this case, it is desirable to align the centerline bisecting the angle formed by both rubbing directions with the direction in which the barrier member 8 extends. At this time, the angular difference between both rubbing directions is preferably set within 12 degrees. Further, if one rubbing direction and the direction in which the barrier member 8 extends are substantially aligned, then the angular difference between both rubbing directions is set within 6 degrees. If the rubbing directions are aligned between the two surfaces P1 and P2, the angle formed by the rubbing direction and the direction in which the barrier member 8 extends need not necessarily be parallel. However, it is preferable that the angle formed by the rubbing direction and the barrier member 8 be set within 12 degrees.

Now, the method of cooling the liquid crystal panel assembly, which constitutes another important requirement of the present invention, is hereinafter described. In order to completely eliminate the alignment defects of the liquid crystal, it is important to (A) control penetration of the liquid crystal into the liquid crystal panel frame, (B) to control the manner in which the smectic phase layer grows and (C) to smooth the contraction of the liquid crystal attended with cooling. Since the control of penetration of the liquid crystal is inevitable, first, the advantage inherent to the structure of the liquid crystal panel frame which is adopted by the present invention is described from the viewpoint of penetrating liquid crystal.

Here, major problems refer to (1) are the affinity between the liquid crystal and the orientation film, (2) the remaining of the air bubbles which generate due to the zigzag run of the liquid crystal as the liquid crystal penetrates into the panel frame, and (3) the accumulation of the distortion of the liquid crystal. With either of the ferroelectric liquid crystal and the anti-ferroelectric liquid crystal, when they penetrates into the liquid crystal panel frame, they preferably penetrate in parallel to the rubbing direction up to the depth of the panel frame and rectilinearly in the rubbing direction because when the liquid crystal is made to penetrate under the same conditions with reference to the differential pressure and the temperature, if the rubbing direction and the penetrating direction angularly deviate, the penetrating speed is correspondingly observed to lag. In other words, if any angle is formed between the rubbing direction and the penetrating direction, the affinity between the orientation film surface and the liquid crystal is reduced. For example, if the liquid crystal is made to penetrate into the panel frame only by surface tension, the liquid crystal can be located in the most natural and stable condition onto the orientation film. In this case, if the angle by intersecting rubbing direction and penetrating direction is set to a right angle, then approximately twice to four times the speed difference is generated.

The greater the affinity between the orientation film and the liquid crystal is, the faster the liquid crystal penetrates into the panel frame, which is favorable from the point of manufacturing. The liquid crystal is stably located on the orientation film in a natural condition, and yet the aligning capability of the interior of the liquid crystal is also strengthened by the action of the orientation film. On the contrary, if the gradient between the rubbing direction and the direction in which the liquid crystal penetrates is made great, the liquid crystal will correspondingly more often snake, and air pockets, that is, the air bubbles or empty gaps become easy to occur. Further, since the liquid crystal is of high viscosity, the snaking pattern of the liquid crystal is stored into the liquid crystal itself as an instable conformation to accumulate a distortions about that snaking portion. This serves as a cause to develop abnormal orientations as they are, or to induce the abnormal orientations as the volume of the liquid crystal is changed. If the liquid crystal is made to penetrate at a right angle to the rubbing direction, it was really found that, even if thereafter the liquid crystal panel assembly is cooled down under the most favorable conditions according to the preset invention, the zigzag defects are relatively increased. This phenomenon occurred regardless of whether both substrates are adhered by means of the barrier member or not, and regardless of the configuration of the barrier member.

Next, a step of making the liquid crystal penetrate in the straightforward direction along the rubbing direction is described. To this end, an as narrow as possible straight passageway is preferably formed between the pair of substrates to make the liquid crystal therein. The longer the distance over which the liquid crystal penetrates becomes, that is, the greater the area of the liquid crystal panel assembly becomes, the more necessary such a passageway becomes. If this is described with reference to the liquid crystal panel frame for encapsulating the liquid crystal, it means that the liquid crystal is made to penetrate within the rectilinear space "R" narrow in cross-sectional area and yet extending in the rubbing direction, as shown in FIG. 1.

Further, it is also necessary to uniformly retain the cell gap by completely adhering the upper and lower substrates by means of the striped-shaped barrier member. If the bead-shaped spacer or the dot-shaped spacer or the like is used without using the stripe-shaped barrier member, the inside portion between the upper and lower substrates becomes a single free space, which in principle allows the liquid crystal to penetrate anywhere. Although the liquid crystal generally tends to penetrate parallel in the rubbing direction, it first penetrates in practice into the narrow portion of the cell gap. This is because the liquid crystal flow snakes turbulently, and in the worst cases, non-penetrating portion remains as the air bubbles, or its snaking is stored into the liquid crystal itself to be accumulated as the distortion of the liquid crystal about the snaking portion. This tendency is remarkable with the panel frame of the type in which both substrates are not adhered. However, even if it is a panel frame of the type in which both substrates are adhered, if the dot-shaped spacer is used, it is not possible to completely prevent the snaking of the liquid crystal. In addition, if the dot-shaped spacer is used, then the presence of the spacer per se causes the turbulence of flow of the liquid crystal, and the distortions of the liquid crystal is accumulated about that spacer.

In view of the foregoing, in order to obtain a desired penetrating state of the liquid crystal, it is effective to form a rectilinear space between both substrates by means of the stripe-shaped barrier member to make the liquid crystal penetrate therein. Such a structure in which despite the rectilinear space formed in parallel relative to the rubbing direction, the barrier member is not adhered to the substrate, that is, the panel frame with the rectilinear space not sealed is disclosed in Japanese Patent Laid-Opens 61-205919, 61-205921. However, if a large area liquid crystal panel assembly is manufactured by using this structure, then a floating necessarily occurs between the barrier member and the substrate, where the flow of the liquid crystal becomes turbulent to make it difficult to advance the liquid crystal straightforwardly. In order to eliminate this problem, it is also conceivable to temporarily seal both substrates as the liquid crystal is made to penetrate, but in that case, a special device for sealing both substrates becomes necessary. Further, when a driving transistor or a backlight or the like is attached to the liquid crystal panel assembly, or when the liquid crystal display that has been manufactured is used, the vibration- and shock-proof properties of the liquid crystal panel assembly become insufficient lacking practicability.

Another reason why the arrangement of the present invention is favorable is described in greater detail from the viewpoint of how layers of the chiral smectic phase grow. First, the ferroelectric liquid crystal is made to penetrate into the panel frame, in which a planar orientation film is properly formed, and in which the substrate has a area of 181 mm×256 mm (that is, B5 size), in the high temperature phase in parallel to the rubbing direction to make a liquid crystal panel assembly. Three panel frames are compared with each other:

(1) one in which both substrates are adhered by means of the stripe-shaped barrier member;

(2) one in which both substrates are adhered by means of the dot-shaped member; and (3) one in which both substrates are not adhered by means of the stripe-shaped member.

After the liquid crystal panel assembly using these panel frames is immersed within a constant temperature water tank accommodating water set to a temperature at which the liquid crystal presents the liquid phase, it was cooled down at a speed of 0.5° C./min. It is in order to cool down the entire surface of the liquid crystal panel assembly as uniformly as possible that it is cooled down within liquid bath.

As a result, with the liquid crystal panel assembly having both substrates adhered by the dot-shaped member and the liquid crystal panel assembly having both substrates not adhered with only the stripe member interleaved therebetween, since the space for encapsulating the liquid crystal which is formed between both substrates is set free as a single space, a multiplicity of large and small zigzag defects or tree-shaped defects generated. In contrast, with the panel frame having both substrates adhered by the stripe-shaped barrier member, defect-free orientated order was stably obtained. However, also with the one having both substrates adhered by the stripe-shaped barrier member, as the size of the liquid crystal display portion is increased to A4 size (that is, 210 mm×295 mm), and further, to B4 size (that is, 256 mm×362 mm), the defect-free alignment could not result.

The alignment defects tend to exhibit many large and small zigzag defects plus some tree-shaped defects with one using non-adherent stripe-shaped member as well as ones using the adherent or non-adherent dot-shaped member. In the liquid crystal panel assembly having both substrates adhered by the stripe-shaped barrier member, although the number of the alignment defects becomes smaller, if the liquid crystal panel assembly is cooled down within, for example, an oven without utilizing the cooling process which features the present invention, there are zigzag defects which divide the plane of the liquid crystal panel assembly into two or three parts, tree-shaped defect, linear defects and the like.

Therefore, how the SmC* phase is generated from the SmA phase to grow within the range observable through a microscope is described with reference to FIGS. 12 and 13. At first, the entire surface of the liquid crystal presents the SmA phase (FIG. 12($a$)), and when the transition from the SmA phase to the SmC* phase starts, a distorted the SmC* phase domain begins to be seen (FIG. 12($b$)), and further the zigzag defects begin to appear (FIG. 12($c$)). Thereafter, the SmC* phase domain further grows (FIG. 13($d$)) and adjacent SmC* phase domains meet (FIG. 13($e$)).

In this case, the domains meet in the following two ways. One is the case where the domains having the same layer-bending direction meet with each other. In this case, if the drapeability is not good at the meeting position, the tree-shaped defects or linear defects often remain therein (FIG. 13($f$)). This is extremely similar to defects generating at the portion where the SmA phase domains which have grown at different positions collide (FIG. 9), which is one of the reasons why the alignment defects are generated in the previous anti-ferroelectric liquid crystal. With this defect, if the outermost boundary of the meeting domains gets out of the area used for the display portion of the liquid crystal display assembly, only the domains in which liquid crystal layers bend in the same direction will remain within the display portion. Another one of how the domains meet is that the domains which differ in the bending direction of layers each grow individually to finally meet. According to this, intrinsic zigzag defects are generated, and further, the treeshaped defects caused by collision will be present within each domain. There is another possibility of occurrence of zigzag defects when domains having reverse bending direction of layers occur in domains having a certain bending direction of layers.

Apart from the defects caused by the colliding domains, a small looped zigzag defect domain happen to emerge suddenly at a certain timing, the domain looking like a grown one in its entirety. This is often observed when the dot-shaped spacer member is dispersed or adhered.

The following is conceivable as the reason why the zigzag defects grow. If the phase changes from the SmA phase to the SmC* phase in the liquid crystal, the molecules within the SmA phase layer are inclined from the direction in which the normal of the layer runs, so that the spacing between the layers of the SmA phase becomes narrow. This narrowed distance is on the order of ten percent of the length of the molecule. If the volume variation of the liquid crystal is small in the neighborhood of the transition point of the liquid crystal phase, the length ranging somewhere within the liquid crystal should have slightly extend in order to compensate for the reduction of the spacing between the layers. However, if the liquid crystal is taken as a whole, the volume contraction due to the decrease of temperature will prevail.

One of the extension of the foregoing liquid crystal extends in the cell gap direction. Since this extension is bounded by the pair of opposed glass substrates, the liquid crystal layers will curve, that is, bend by the magnitude corresponding to the amount of the extension. Another one of the extension runs in the vertical direction thereto, that is, in parallel to the glass substrate. Actually, a combination of these extensions appears, but the extension running in the cell gap direction is quantitatively greater. T. P. Rieker et al teach, in Physical Review, A37, 1053 (1988), that only the bending movement of layer which is substantially proportional to the magnitude of the extension of the liquid crystal was found, and this bending structure is called the chevron structure indicated in FIG. 7. Generally, the bending directions of the layer of the liquid crystal include one indicated by the numeral 111 and one indicated by the numeral 112. The zigzag defect 113 ia appeared at the boundary between the aforesaid domains each having its own direction.

The tree-shaped defects are considered to be generated by collision of the liquid crystal phase domains having liquid crystal layers which are bent in the same direction. If, as in the present invention, the rectilinear spaces are each continuously formed in parallel in multiple number between the pair of opposed glass substrates, to encapsulate the liquid crystal therein to form the liquid crystal panel assembly, when the liquid crystal is to be uniformly cooled down in, for example, the oven, as conventionally, this type of tree-shaped defects will be generated. However, the amount of generating defects was found very small as compared with the conventional type liquid crystal panel assembly in which the liquid crystal is encapsulated into the released single space. This is a difference caused depending on whether the liquid crystal is constrained within a thin and narrow space or not. That is, by the action of barrier members according to the present invention, it can very rarely happen that the liquid crystal phase domains respectively grow in the lateral direction as indicated by arrows Z—Z, namely, at a right angle to the barrier member to collide against each other. Assuming that the size of the area where one crystal nucleus occurs is unit area 1, the number of times of the collision among domains is proportional to about the value of $(2a^2-2a)$ at the area having a side length of "a" ($a \gg 1$).

If the dot-shaped spacers are used, even when both substrates are adhered or not adhered by means of those spacers, the bending direction of the liquid crystal layer can be defined in a constant direction. However, it is impossible to avoid the defects generated by the collision of the liquid crystal phase domains within the large area. Even if the structure of the liquid crystal panel assembly according to the present invention is adopted, there can be some chance left that the liquid crystal phase domains grow in parallel to the rectilinear space to cause the tree-shaped defects. However, such a possibility of causing the tree-shaped defects can be reduced by adopting the cooling process of the liquid crystal panel assembly according to the present invention.

Now, a means for restricting the bending direction of the chiral smectic phase layer, which constitutes the most important factor of the present invention, and the theoretical facts supporting the above means are described. The reason why the nucleus, namely, the minor liquid crystal phase domain which causes alignment defects may be a local fluctuation of temperature. If the size of the liquid crystal panel assembly becomes great, even if that liquid crystal panel assembly is immersed within a medium having an as large as possible calorimetric capacity, the generation of the temperature distribution cannot be blocked. To that end, a very bulky cooling unit becomes necessary, and is actually impossible to implement. Therefore, the applicant reviewed experimentally what would happen within the liquid crystal layer as the temperature of the liquid crystal panel assembly is locally lowered, and found the following experimental facts.

That is, the bending direction of the liquid crystal layer in the chevron structure is oriented toward a portion where the temperature was previously lowered in time. The reason why such a phenomenon occurs was inferred to involve the volume contraction of the liquid crystal attended with the cooling. This phenomenon did not depend on the combination of the orientation film and the liquid crystal.

As already described, in substantial synchronism with the liquid crystal layer extending in the cell gap direction at the transition point of the liquid crystal phase, a major volume contraction never fails to happen from the perimeter toward the central portion of the cooling point, which draws the peripheral portion toward the cooling point with the result that the central point of the layer running in parallel to the substrates deviates in that direction. That is, as schematically shown in FIG. 14(a) and (b), liquid crystal layers A are bent toward the portion Q where is previously cooled in time, and the bending direction is very likely to be determined depending on which portion is previously cooled down. Incidentally, in FIG. 14, the sign "M" denotes a liquid crystal molecule.

From the foregoing, it can be found that if the liquid crystal panel assembly is cooled down along one direction, the bending direction of the liquid crystal layer can necessarily be defined in a constant direction. Since the direction in which the chiral smectic phase layer runs is also dominated by the mutual action of the orientation film and the liquid crystal so as to run in substantially parallel to the rubbing direction, the bending direction does not form a concentrical configuration with the cooling point taken as axis. In the present invention, in order to restrict the bending direction of the smectic phase layer, the liquid crystal panel assembly is cooled down intentionally imparting the temperature gradient in parallel from one end toward the rubbing direction so that the temperature gradient is reversed by no means. By so doing, the bending direction of the liquid crystal layer can be defined in principle and in practice.

In fact, with the liquid crystal panel assembly of any arrangement, when the liquid crystal panel assembly is intentionally cooled down so that the temperature gradient is applied along the rubbing direction, the liquid crystal layers are bent in almost one direction. As a preferred method of cooling down the liquid crystal panel assembly while keeping the temperature gradient, for example, the liquid crystal panel assembly is immersed within a liquid bath held to a constant temperature, and thereafter, is pulled up at a constant speed, or liquid is drained to for motion around the boundary plane between liquid and the air. However, even if such a cooling process is used, unless that object to be cooled is a liquid crystal panel assembly having a structure according to the present invention, the zigzag defects and the tree-like defects often occurred.

On the other hand, another advantage of adopting the method of the present invention is that the generation of the tree-like defects can securely be blocked. That is, since the liquid crystal panel assembly is sequentially cooled down from one end of the rectilinear space toward the other end the rectilinear space which is formed with the barrier member, no liquid crystal phase domains grow simultaneously at the different places running in parallel to the barrier member, and thus, the tree-like defects caused by the collision of the domains do not practically happen in the direction parallel to the barrier member.

On the other hand, since the liquid crystal phase domains generating within the liquid crystal grow side by side in the direction perpendicular to the stripe-shaped barrier member, that is, in the width direction "L" of the rectilinear space of FIG. 1, there is a chance that the tree-like defects caused by the collision of the domains be generated in that direction. However, by narrowing the gap "L" between the adjacent barrier members 8, such tree-like defects can securely be eliminated. When that gap "L" is set to equal the width of the electrode 5, the probability that the tree-like defects are generated becomes minimal. In the case where the planar electrode is employed, the gap "L" between the barrier members can be set arbitrarily. However, when that gap "L" was set to below 2 mm, this type of tree-like defects did not happen at all. Thus, both alignment defects of zigzag and tree-like defects, can simultaneously be eliminated. In view of the fact that the gap "L" between the barrier members 8, namely, the width "L" of the rectilinear space "R" is desired to set to below 2 mm and, further, the cell gap "G" is desired to set to below 3 µm, it shows that the cross-sectional area of the rectilinear space "R" be desired to set to 0.006 mm² or less.

Now, the advantages obtained by utilizing the liquid crystal panel assembly and the specific method of cooling the same are described from the viewpoint of smoothing the movement of the substance attended with the contraction of volume of the liquid crystal. The defects which can be eliminated from this viewpoint are mainly considered to be the linear defects and the empty gap seen at the central portion of FIG. 14(b). This empty gap is usually generated when the liquid crystal panel assembly is unevenly or rapidly cooled down. In order to restrict the bending direction of the liquid crystal layer in one direction, the liquid crystal panel assembly may be cooled down from one end of the liquid crystal panel assembly along the rubbing direction. In this case, each reversible two directions are conceivable for that cooling direction, one of which has the tendency to generate the linear defects. However, even in this case, every linear defect will completely disappear if the temperature is decreased slowly from the one direction properly selected along the rubbing direction.

How the SmC* phase appears from the liquid phase is schematically illustrated in FIG. 15(a) through (c). In the state of (a), the entire liquid crystal 1 encapsulated within the glass substrate 2 is placed in the hot condition presenting a liquid phase. In the state of (b), if the liquid crystal is gradually cooled down from above as viewed in FIG. 15, the interior of the liquid crystal undergoes in phase according to the sequence of the liquid phase—the chiral nematic (N*) phase—the SmA phase—the SmC* phase. At this time, most of the liquid crystal other than the neighborhood of the orientation film is shifted toward an arrow "B", and the contraction of the liquid crystal generally advances in the direction of an arrow "C". In the state of (c), as the cooling advances, the area of the defect free SmC* phase is increased. If such a phase transition and the shift of the liquid crystal cannot be achieved smoothly, it is inferred that the linear defects generate and, in the extreme case, empty gaps can happen at a right angle to the direction in which the phase shift progresses. Sometimes, empty gaps can happen in parallel to the rubbing direction.

Schematically, it is considered that the linear defects may happen if the shifting rates of the liquid crystal embedded within the channels formed on the orientation film by the rubbing process, that is, the rubbing channels, slightly deviate. This is because since the cooling is not even with one using the oven the movements of the substances along the individual adjacent channels are difficult to synchronize.

Another cause of generating linear defects is that the liquid crystal strikes against the barrier member as being cooled and its contraction is prevented when the stripe-shaped barrier member extends along the direction which is different from the rubbing direction. Even if definite defects do not appear, the distortion of the liquid crystal is accumulated at the portion where the contraction of the liquid crystal is blocked.

As described above, the generation of the linear defects is associated with the direction in which the liquid crystal panel assembly is cooled down. This is because that depending on the relationship between the orientation film and the liquid crystal, there is a direction in which the liquid crystal layer is easy to shift (FIG. 14(a)) and, in the opposite direction, the movement of the liquid crystal layer cannot smoothly be achieved (FIG. 14(b)). In other words, since a certain type of preferable bending direction of the liquid crystal layer exists according to the combination of the orientation film and the liquid crystal, and since a competition is caused between the bending direction defined by cooling and that preferable bending direction, the defects might easy to occur. Although the contraction of volume of the liquid crystal also occurs in the direction perpendicular to the direction in which cooling progresses, this contraction is restricted by the action of the barrier member, and thereby its propagation is prevented.

In contrast, in the conventional liquid crystal panel assembly, since an uneven contraction of the liquid crystal is caused in every direction other than the direction running along the rubbing direction, and yet the gap between the substrates cannot correspondingly be changed, distortions are easy to be accumulated within the liquid crystal. Those distortions will mainly appear as large and small zigzag defects. As described above, with the conventional liquid crystal panel assembly regularly disposed with the dot-shaped spacer members, zigzag defects occur regularly. Also from this, it is found that the distortions of the liquid crystal are distributed regularly. With such a conventional liquid crystal panel assembly, even if one end of the liquid crystal panel assembly is first cooled down, the uneven contraction of the liquid crystal cannot be controlled. In consequence, defect-free alignment cannot be achieved in the low temperature phase. This is also the case with the case where the stripe-shaped members are used with not being adhered.

It is especially important with the anti-ferroelectric liquid crystal that the volume contraction is generally also generated in the SmA phase during cooling progresses. However, according to the present invention, that volume contraction is restricted within the rectilinear space partitioned by the barrier member in the direction in which the barrier member extends, so that potential accumulation of the distortion of the liquid crystal is small. Unless there is such a partition, the volume contraction of the liquid crystal is generated in every direction, and the distortions of the liquid crystal is accumulated, which induces alignment defects.

Next, an apparatus for imparting the temperature gradient to the liquid crystal panel assembly in which the liquid crystal is encapsulated is described. In the present invention, two atmospheres, namely, a high temperature atmosphere and a low temperature atmosphere, are prepared. Then, the liquid crystal panel assembly is placed within the high atmosphere to retain the high temperature phase having a certain temperature. The entire liquid crystal panel assembly need not to be within the high temperature atmosphere. However, the high temperature atmosphere is prepared so that more than 5 cm of the width including at least the portion where the temperature is first lowered, and more preferably so that the entire liquid crystal presents the high temperature phase. It is meaningless that the high and low temperature atmospheres is spaced apart more than the length of the liquid crystal panel assembly. Further, a continuous temperature gradient may be present between both atmospheres, or the temperature may be limited with a poorly thermally conductive heat insulating member interleaved therebetween. The distance per se between both atmospheres is properly set so as to correspond to the size of the liquid crystal panel assembly, the temperature range of each phase which can be taken by the liquid crystal, phase of the liquid crystal in the high temperature condition or the like.

The high temperature atmosphere can be selected from among various atmospheres. There are, for example, atmosphere within the oven, atmosphere within the water tank having a large calorimetric capacity, and atmosphere being kept in contact with the solid heat evolving elements such as a hot plate, Pertie element and the like. The low temperature atmosphere may be determined according to the temperature at which the liquid crystal exhibits the SmC* phase, and may be one within the oven or in the air.

The advantage obtained by interleaving the heat insulating member between the high and low temperature atmospheres is that the temperature gradient of the atmosphere surrounding the liquid crystal panel assembly can be held constant. The radiating heat between the heat sources, heat conduction, heat convection and the like are very probable to make the temperature gradient fluctuate around the liquid crystal panel assembly, which fluctuation in turn induces the defects within the panel assembly. However, if the heat insulating member is used, such a fluctuation of the temperature gradient can be suppressed. The temperature gradient may be achieved with respect to the liquid crystal panel assembly, and the heat gradient need not exist within the atmosphere between the high and low temperature portions. When the temperature gradient is presented, it is desired to generate from one end side where cooling is started through the thermal conduction of the liquid crystal panel per se. Further, if the liquid crystal assembly is arranged so as to pass through the heat insulating portion to shift, then the effect exercised on the liquid crystal panel assembly from the exterior can securely be prevented. In particular, if the high temperature portion is realized by liquid, such as water, provision of the heat insulating portion proved to be effective in eliminating various adverse effects resulting from water vapor, and further, in preventing the vibration of the liquid surface.

As regards the angle formed by the direction in which the temperature gradient runs between the high temperature portion and the low temperature portion, and the rubbing direction, namely the direction in which the barrier member extends, the greatest component of the temperature gradient need not necessarily runs parallel to the rubbing direction. For example, when the temperature gradient is caused to the liquid crystal panel assembly by pulling up it out of the liquid acting as the high or low temperature portion, the liquid crystal panel assembly may be pulled up vertically with the rubbing direction of the liquid crystal panel assembly inclined by an appropriate angle θ from the vertical direction relative to the boundary plane between the air and the liquid.

When the inclined angle θ is 90°, no temperature gradient occurs relative to the rubbing direction, so that such a condition falls out of the technical scope of the cooling method of the present invention, and hence, a multiplicity of alignment defects can often happen. However, when the inclined angle θ was set to 70° or less, and preferably, 60° or less, no defects were generated because the bending direction of the liquid crystal layer is going not to deviate greatly from the layer-direction of the liquid crystal which is determined by the rubbing process with the angle θ being great.

In order to shift the temperature gradient formed on the liquid crystal panel assembly between the high and low temperature portions in parallel on the surface of the liquid crystal panel assembly, the high and low temperature portions may be shifted relative to the liquid crystal panel assembly, or the liquid crystal panel assembly may be shifted relative to the high temperature portion or the like. However, in view of the manufacturing capacity and the manufacturing cost, it is advisable to shift the liquid crystal panel assembly.

(Effects of the Invention)

According to the present invention, the barrier member which forms the rectilinear space firmly and flexibly adheres the upper and lower substrates, so that a liquid crystal panel frame or a liquid crystal panel assembly excellent in vibration- and shock-proof properties which does not destroy the orientated liquid crystal phase can be obtained. Since this liquid crystal panel and the like do not bend if one touches by hand, and yet can freely be carried without deforming, the operability when the liquid crystal display is assembled by fitting the attachments such as the driving transistors or the like to the liquid crystal panel assembly is improved. Further, the vibration- and shock-proof performances are also improved upon being used as the liquid crystal display.

Further, according to the method of manufacturing the liquid crystal panel assembly of the present invention, (1) the penetrating direction of the liquid crystal is restricted by the rectilinear space which is a narrow passageway, (2) the penetrating direction is defined in parallel to the uniaxially orientated direction, for example, the rubbing direction, and yet (3) the liquid crystal panel assembly is sequentially cooled down so that the temperature gradient is generated in the uniaxially orientated direction, and the liquid crystal therein is changed into the low temperature phase, for example, the SmC* phase. By such a synergetic process, a completely defect-free orientated chiral smectic phase, which has been impossible to achieve by conventional manufacturing process, can be formed on the large area liquid crystal panel assembly with excellent repeatability and securely. Further, a high quality and large-size liquid crystal display can be inexpensively produced.

Still further, since the liquid crystal is passes through the narrowly partitioned rectilinear space, the liquid crystal can be sealed into the liquid crystal panel frame of very large area in a manner that no non-filled portion is generated.

Further, any combination of commercially available ordinary ferroelectric or anti-ferroelectric liquid crystal and polyimide series orientation film of appropriate surface necessarily allows the defect-free alignment to be obtained without applying any special device only if the liquid crystal is sealed within the liquid crystal panel frame.

Still further, according to the present invention, it has been demonstrated for the first time that the ferroelectric or anti-ferroelectric liquid crystal can be applied to a super large size liquid crystal display such as high vision without any problem.

Finally, the method of the present invention calls for no special apparatus such as a vacuum apparatus, and can readily be introduced into the mass production line from the industrial point of view, so that the liquid crystal panel assembly using the ferroelectric and anti-ferroelectric liquid crystals can be produced at low cost.

BRIEF DESCRIPTION OF THE DRAWINGS

FIG. 12 is a view schematically illustrating a process in which the tree-like defects are generated;

FIG. 14 is a view schematically illustrating a situation in which the liquid crystal layer is bent toward the place where the temperature is lower. Specifically, (a) illustrates a case in which the temperature is lowered first from the right side, and (b) illustrates a case in which the temperature is sequentially lowered from both right and left sides toward the central portion;

DETAILED DESCRIPTION OF THE PREFERRED EMBODIMENTS

EXAMPLE 1

Figure 1:
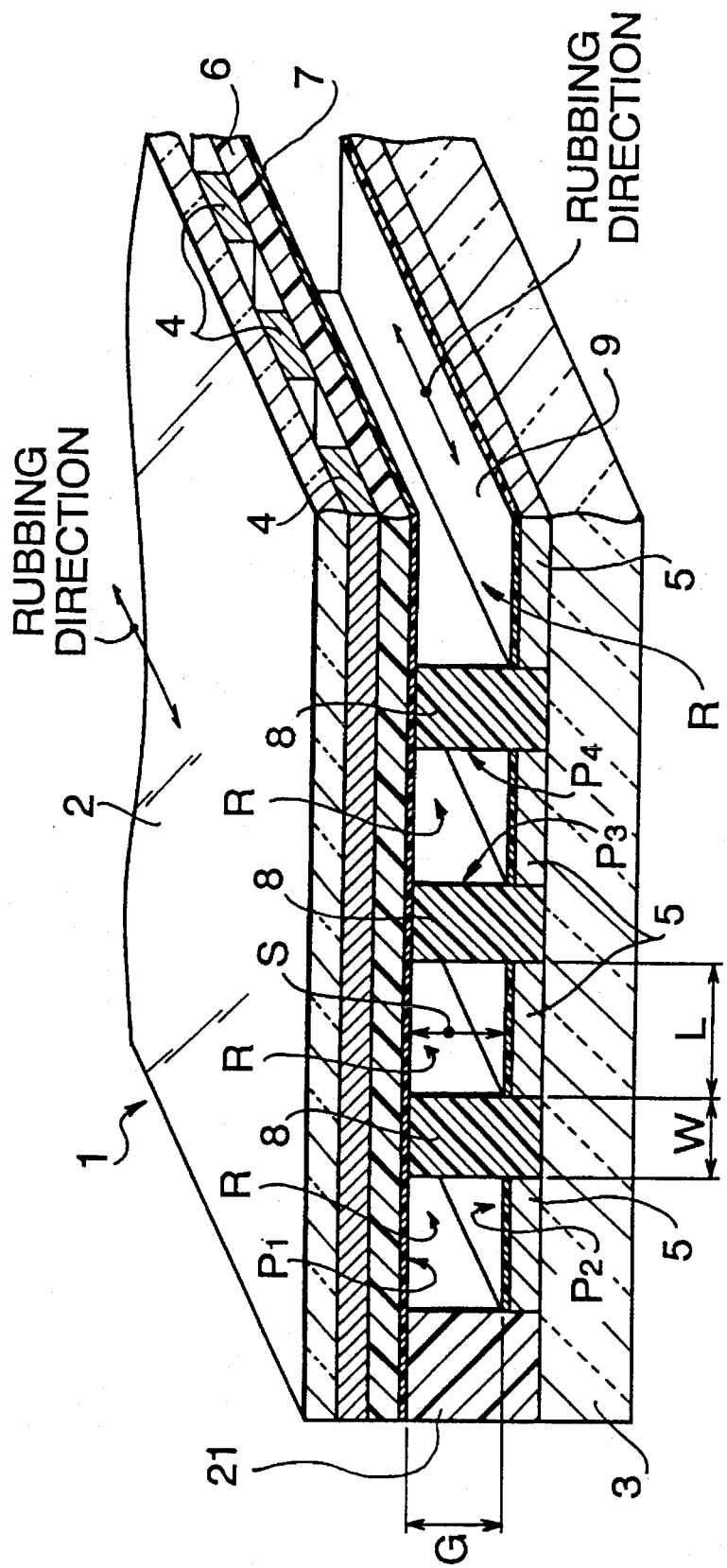
FIG. 1 is a perspective cross-sectional view of the internal structure of a liquid crystal panel frame or a liquid crystal panel assembly according to the present invention.

Referring to FIG. 1, a set of transparent substrates 2, 3 surface flatness of which is machined within 2 μm is prepared. Those substrates 2, 3 are produced by an optically polished glass plate having a size of 256 mm×362 mm (that is, B4 size) and 1.1 mm in thickness. ITO (Indium Tin Oxide) film having a thickness of 1500 angstrom is formed on each substrate 2, 3 by sputtering, and then stripe-shaped ITO electrodes 4, 5 having the line width of 270 μm and a pitch of 300 μm were formed by routine photolithography except both side of the substrates 2, 3 by 1 cm. The length of the electrode 4 at the side of the substrate 2 is the same as that of the substrate 2 as taken in the longitudinal direction, and the length of the electrode 5 at the side of the substrate 3 is the same as that of the substrate taken in the lateral direction.

Then, after solution of 2% polyimide resin (HL1110 commercially available from Hitachi Kasei Kogyou Corporation) was spin coated on the substrate 3 at 1000 rpm for 30 sec, an orientation film 9 or the substrate 3 was dried in an oven of 180° C. for about one hour. And then, the orientation film 9 was subjected to the rubbing process at the room temperature in parallel to the electrode 5 for obtaining a both-side-rubbing condition. Further, solution of the resist MP-S1400 with viscosity 25 cp (Sypray Corporation) was spin coated on the substrate 3 for 20 sec. Then, by routine photolithoghaphy, the adherent barrier members 8 having a pattern of FIG. 2 were entirely formed at the position where they did not overlap with each ITO electrodes 5. Thereafter, the substrate 3 was dried for one hour at 140° C. The thickness, width and length of the barrier member 8 were set to 2 μm, 30 μm and 20 cm respectively. The number of the barrier members 8 amounted to 900.

Figure 2:
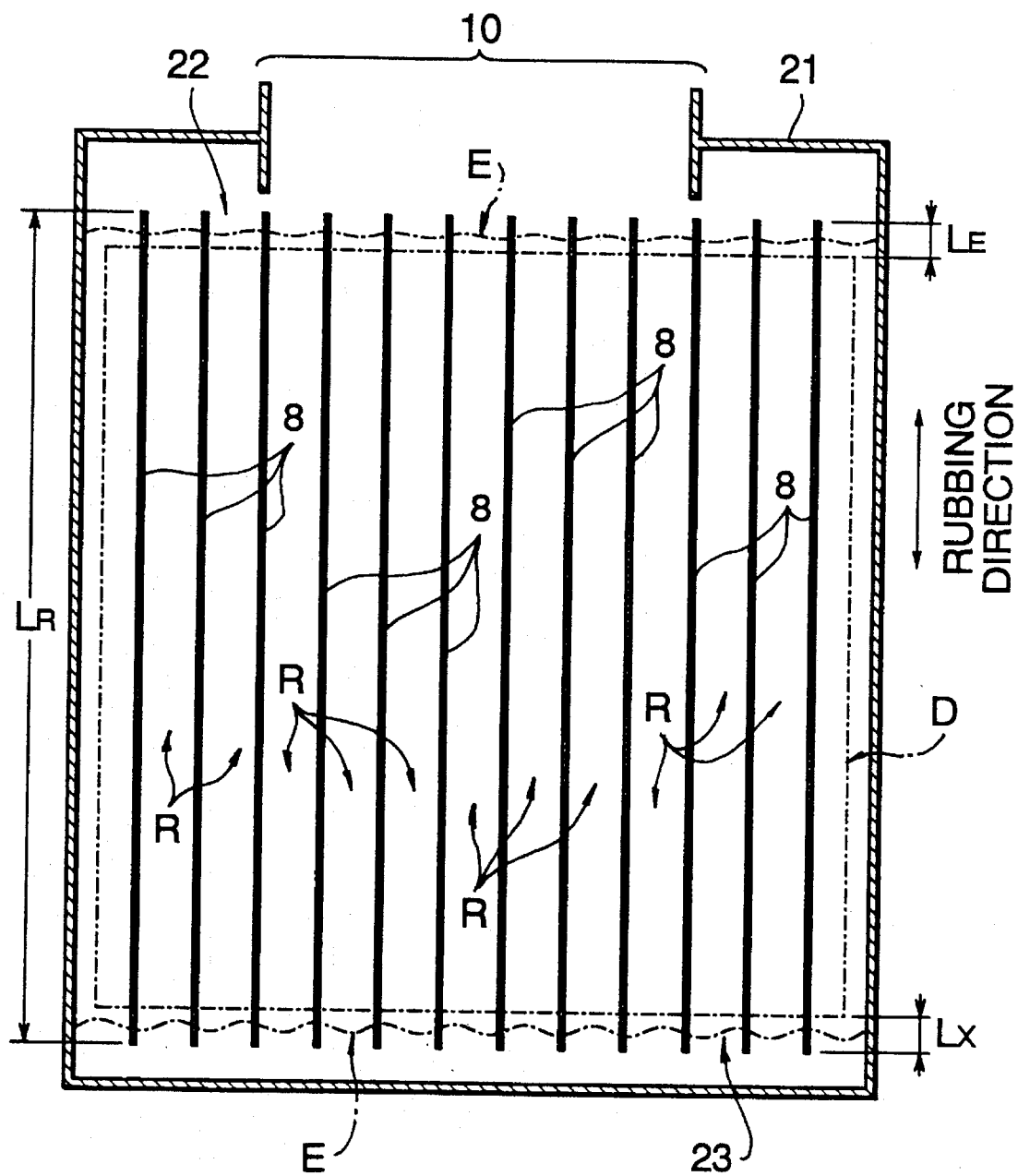
FIG. 2 is a plan cross-sectional view of the liquid crystal panel assembly.
Figure 3:
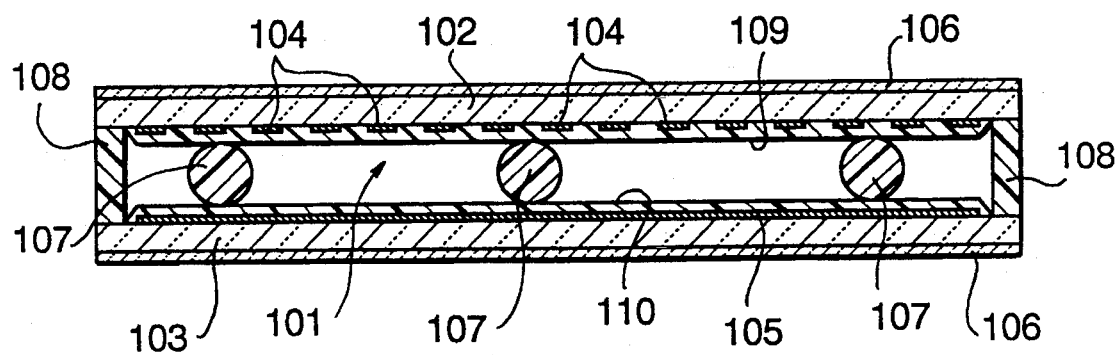
FIG. 3 is a plan cross-sectional view of the internal structure of a conventional liquid crystal panel assembly.
Figure 4:
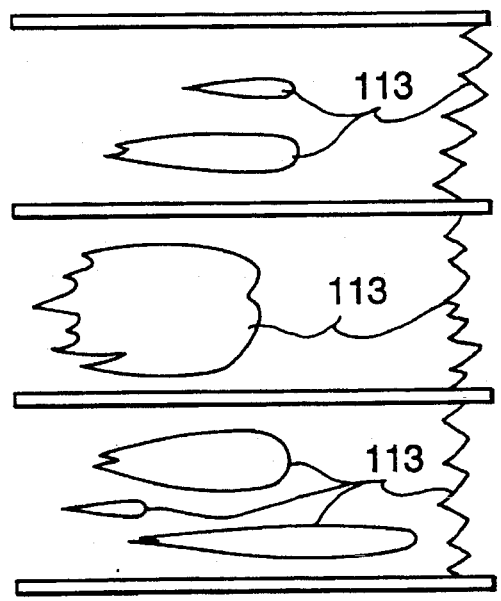
FIG. 4 is a plan view illustrating an example of zigzag defects, which are one of the abnormal orientations.
Figure 5:
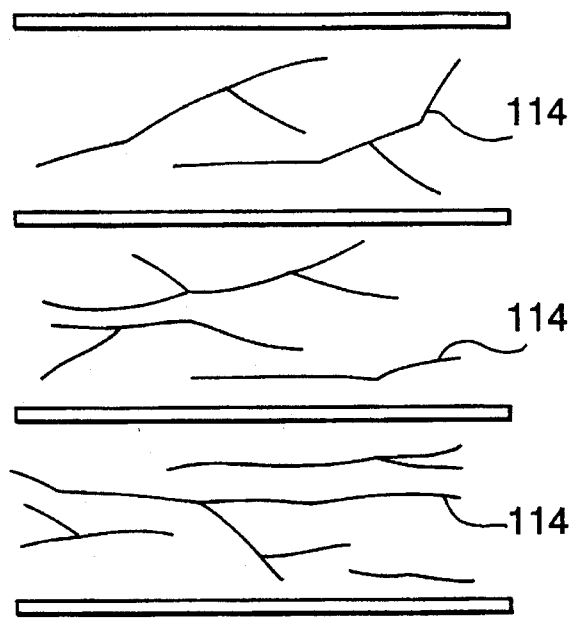
FIG. 5 is a plan view schematically illustrating the tree-like defects, which are one of the abnormal orientations.
Figure 6:
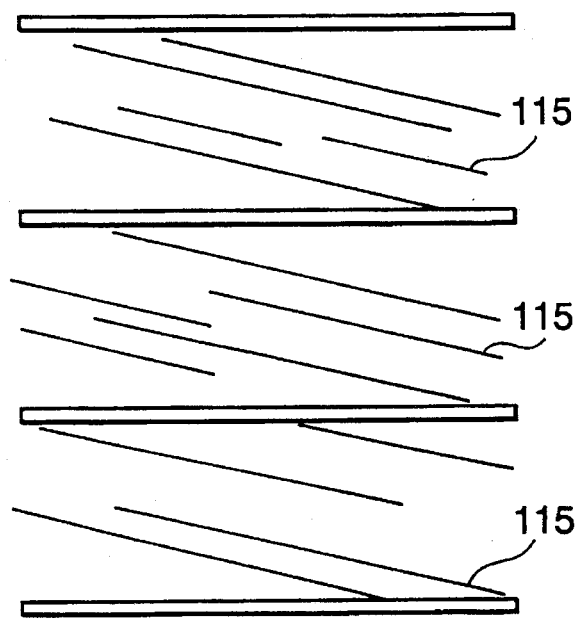
FIG. 6 is a plan view schematically illustrating the linear defects, which are another one of the abnormal orientations.
Figure 7:
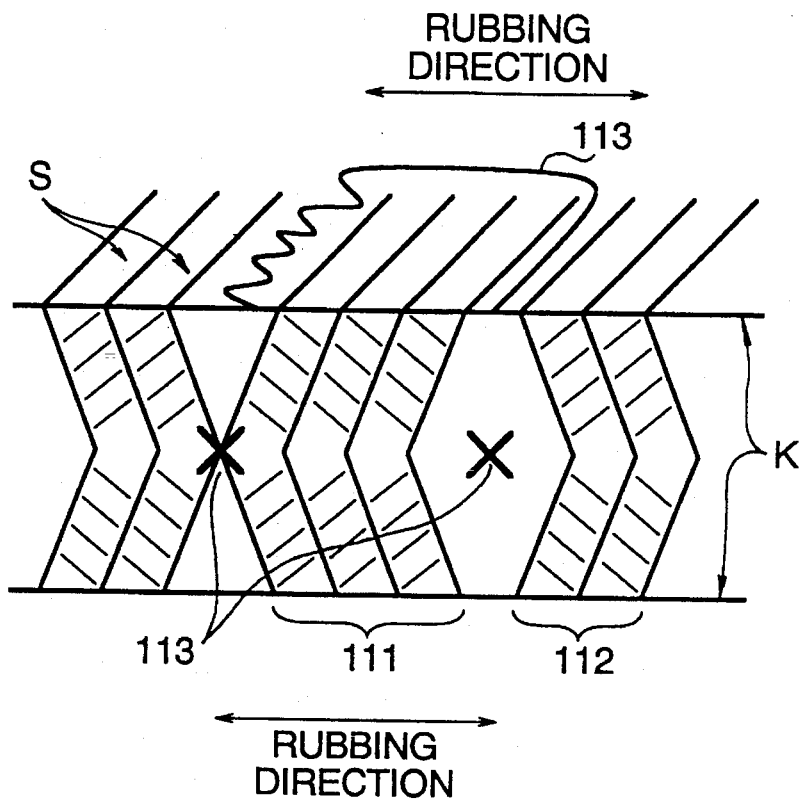
FIG. 7 is a perspective cross-sectional view schematically illustrating a relationship between the chevron structure and the zigzag defects structure which is seen in the layer of the SmC* phase.
Figure 8:
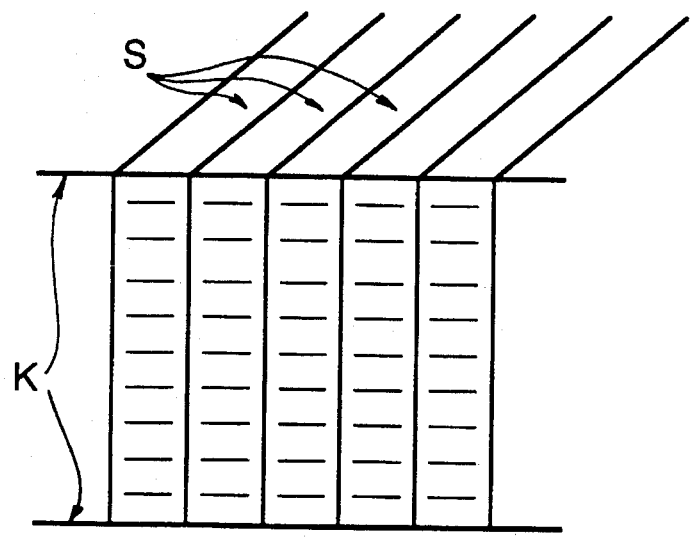
FIG. 8 is a perspective cross-sectional view illustrating a bookshelf structure of the layer of the SmC* phase.
Figure 9:
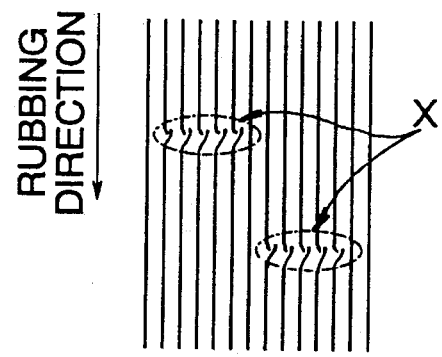
FIG. 9 is a view schematically illustrating the deviation of layers which is one of the abnormal orientations of the anti-ferroelectric liquid crystal.
Figure 10:
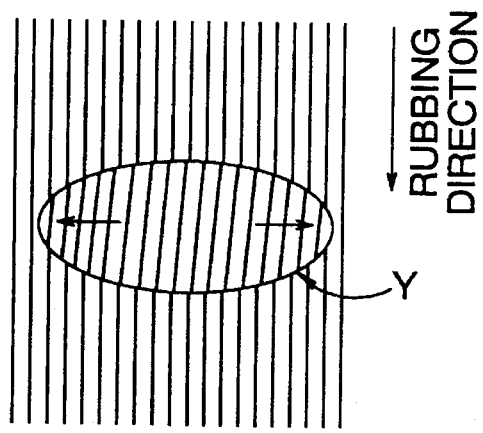
FIG. 10 is a view schematically illustrating the presence of two domains which grow in the different direction, which is another one of the abnormal orientations of the anti-ferroelectric liquid crystal.
Figure 11:
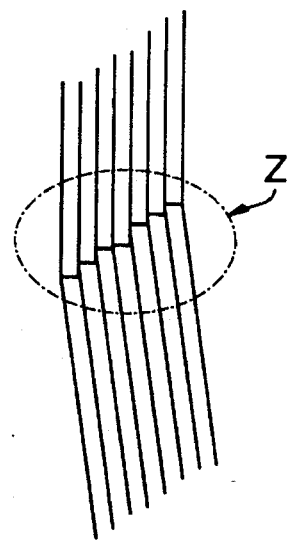
FIG. 11 is a view schematically illustrating another deviation of the layers, which is a still another one of the abnormal orientations of the anti-ferroelectric liquid crystal.
Figure 13D:
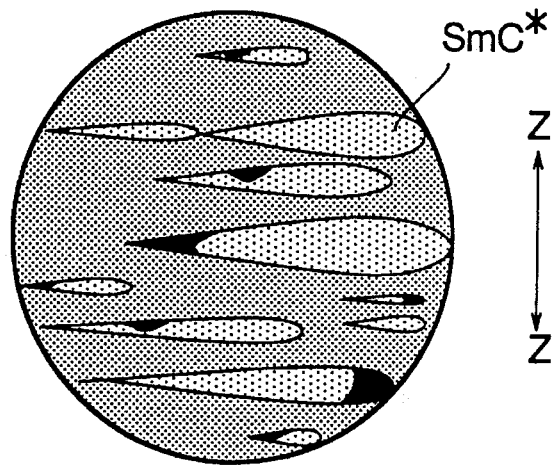
FIG. 13 is a view schematically illustrating a process in which the tree-like defects are generated in succession to FIG. 12.
Figure 13E:
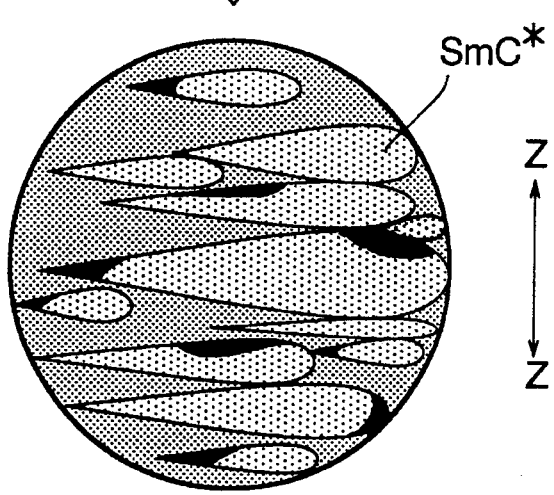
Figure 13F:
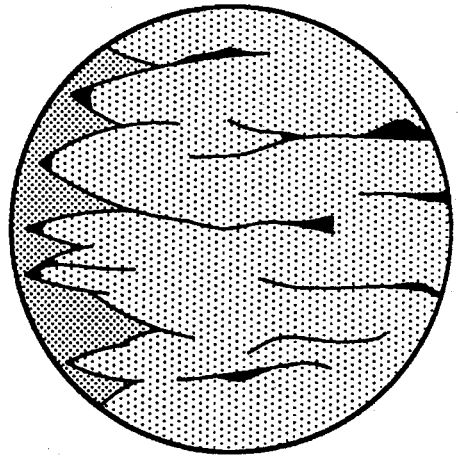
Figures 15A, 15B, 15C:
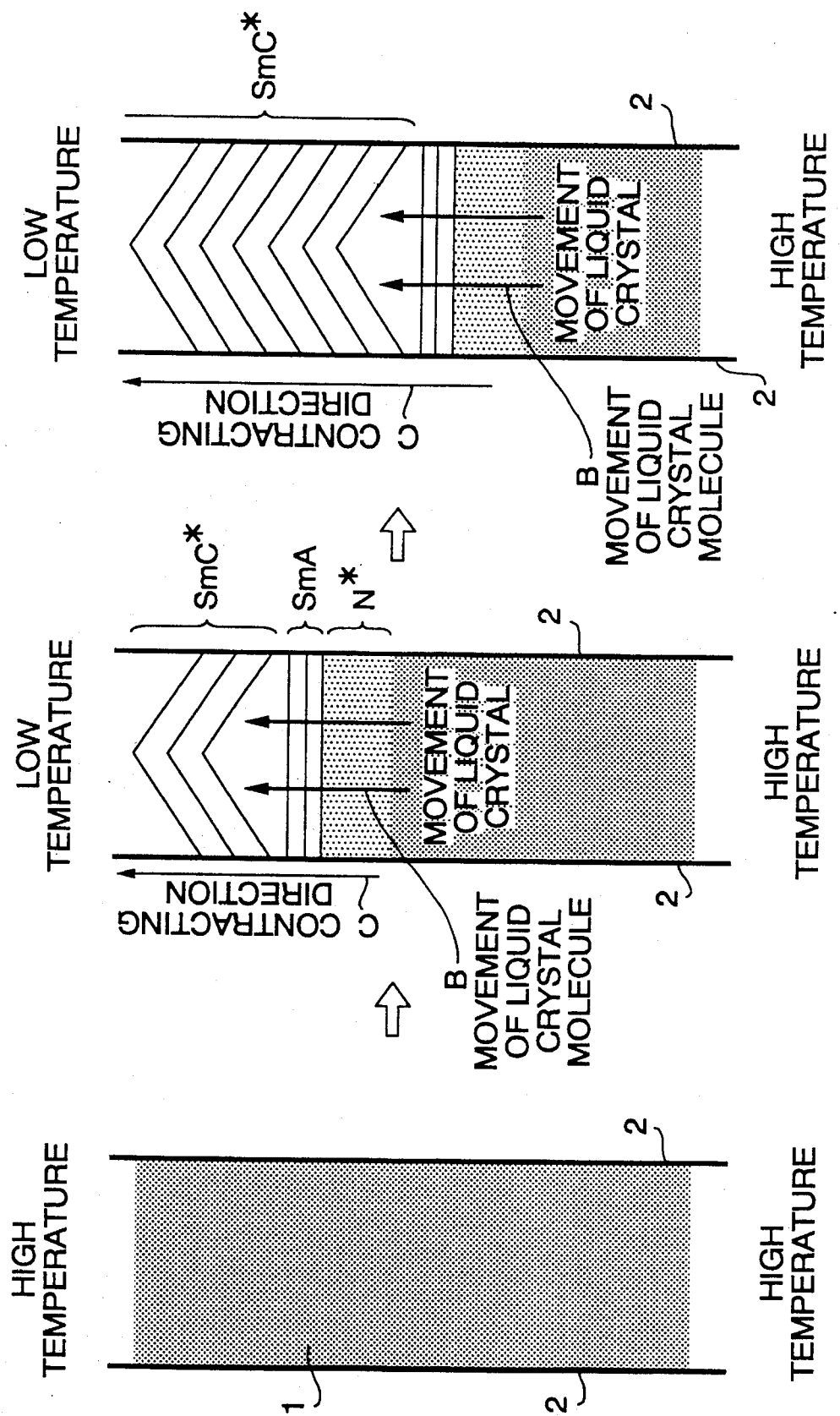
FIG. 15 is a view schematically illustrating a state in which different liquid crystal phases are gradually generated within the liquid crystal in which the SmC* phase bends.

In FIG. 2, a wide width line portion 21 surrounding a display portion "D" is intended to adhere the peripheral portion of the glass substrates 2, 3, and also serves as a seal portion which prevents encapsulated liquid crystal from being diffused and being in contract with the atmosphere. The aperture 10 for conducting the liquid crystal was formed at one end side of the barrier member 8. After solution of 2% polyimide resin (HL1110; commercially avail able from Hitachi Kasei Kogyou) was spin coated on the opposed substrate 2 at 1000 rpm for 20 sec, the substrate 2 was dried for about one hour in the oven having an inner temperature of 180° C. to form an orientation film 7. And then, the rubbing process was conducted on the orientation film 7.

After the completion of the rubbing process, both substrates were over lapped to provisionally be contact with each other so that the rubbing direction runs in substantially parallel to barrier members 8 and so that the upper and lower rubbing directions run in the same direction. With this state held, they were set to a device for applying atmospheric pressure (not shown) to draw out the air from the interior of the panel assembly, namely, the rectilinear space "R". Thus, both substrates 2, 3 were found to completely be contact with by the atmospheric pressure. Then, with the rectilinear space deaerated, the panel assembly was set into the oven inner temperature of which rose up to 180° C. by the temperature speed of 5° C./min and was kept at 180° C. for one hour. Thereafter, the oven was gradually cooled to the room temperature and the pressure returned to the normal pressure. By this, a liquid crystal panel frame, the cell gap of which is 1.8 μm and, in which the upper and lower substrates 2, 3 were firmly adhered and yet have a group of barriers constituted by barrier members 8, was obtained. The area of the display portion "D" was set to 27 cm×20 cm.

Then, the periphery of the obtained liquid crystal panel frame was fixedly adhered by epoxy resin or the like to make a structure excellent in vibration-proof, shock-proof and sealing performances. After this liquid crystal panel frame was set to the vacuum heating furnace to deaerate to $10^{-2}$ pa, the temperature was elevated up to 90° C, and then, the liquid crystal conducting aperture 10 is immersed within a ferroelectric liquid crystal CS1014 (commercially available from Chisso Corporation) which is held in a liquid crystal reservoir. When this condition was held, the liquid crystal penetrated into the inside of the panel assembly at the rate of about 1.5 cm/hour. Incidentally, CS1014 undergoes a phase transition of the liquid phase—82° C.—the chiral nematic phase—71° C.—the SmA phase—64° C.—the SmC* phase.

After the liquid crystal entered completely into the liquid crystal panel frame, the frame was returned to the room temperature for about three hours, the liquid crystal conducting aperture 10 was sealed with the epoxy resin to obtain the liquid crystal panel assembly in which the liquid crystal was completely sealed.

Apart from the above liquid crystal panel assembly, the following two kind of liquid crystal panel assemblies which have a similar panel structure and a similar liquid crystal were produced and prepared. One of the above additional panel assemblies had a rubbing property of the anti-parallel rubbing condition. The other additional panel assembly had a rubbing property of the either side rubbing condition. The chevron structure and the alignment defects were observed by changing the cooling direction in the foregoing three types of liquid crystal panel assemblies. The result as listed in table 1 was obtained.

TABLE 1

| RUBBING DIRECTION | COOLING DIRECTION | DEFECTS |
| --- | --- | --- |
| (a) the same direction between both substrates (FIG. 16) | reverse to the rubbing (FIG. 16) | not observed |
| (b) the same direction between both substrates (FIG. 17) | the same as the rubbing (FIG. 17) | may occur |
| (c) reverse direction between both substrates (FIG. 18) | the same as the lower rubbing (FIG. 18) | not observed |
| (d) reverse direction between both substrates (FIG. 19) | the same as the upper rubbing (FIG. 19) | not observed |
| (e) one side rubbing (FIG. 20) | reverse to the rubbing (FIG. 20) | not observed |
| (f) one side rubbing (FIG. 21) | the same as the rubbing (FIG. 21) | may occur |

Figure 22:
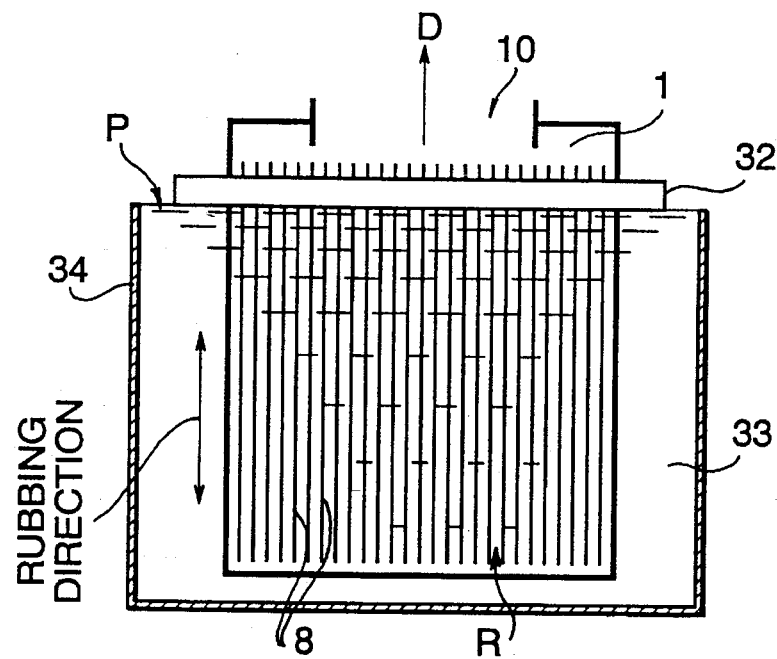
FIG. 22 is a view schematically illustrating an embodiment of an apparatus for manufacturing the liquid crystal panel assembly according to the present invention.

A method using a manufacturing apparatus as shown in FIG. 22 was adopted. In the figure, the liquid crystal panel assembly 1 was immersed within a water tank 34 the temperature of which was controlled to 85° C. and was held for three minutes so as to make the entire liquid crystal take the liquid phase, namely, the high temperature phase. Then, water in the water tank 34 was drained, or the liquid crystal panel assembly 1 was pulled up from the water at the rate of 2.5 cm/min, as indicated by an arrow "D", so that the boundary plane "P" between water and air was lowered. The cooling direction can be changed by reversing the direction in which the liquid crystal panel assembly 1 is immersed in the liquid.

A foamed styrol plate having thickness of 20 mm and provided with a slit through which the liquid crystal panel assembly 1 can pass was used as a heat insulating member 32 for insulating heat between the atmosphere and the water 33. The atmosphere serves as the low temperature portion and the water 33 serves as the high temperature portion. This heat insulating member 32 floats on the water-surface so as to prevent the water-surface from beating, and when the water is drained, the heat insulating member 32 moves simultaneously with the water surface. The boundary plane between the water 33 and the atmosphere moves on the surface of the liquid crystal panel assembly. The moving direction of the boundary plane is substantial parallel to the rubbing direction of the liquid crystal panel assembly, and hence, is also to barrier members 8. At this time, the relationship between the high and low temperature sides and the rubbing direction was taken as shown in FIGS. 16 through 21. Incidentally, in these figures, a thick line "F" indicates a pre-tilting direction of the liquid crystal which is preferable to the orientation film.

Figure 16:
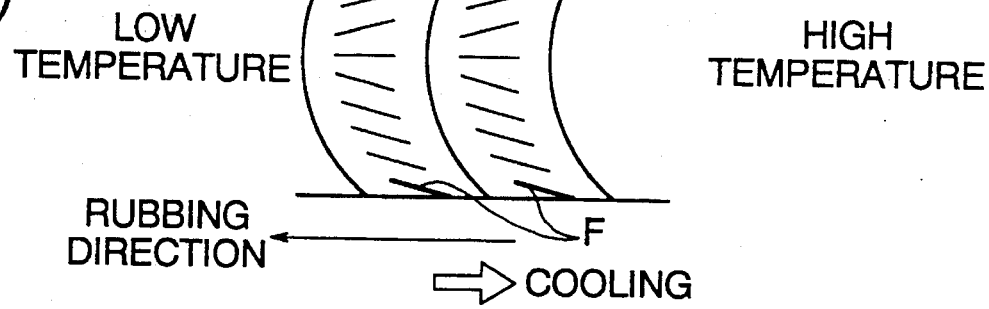
FIG. 16 is a view schematically illustrating the bending direction of the liquid crystal layer and the inclined state of the liquid crystal molecule relative to both the rubbing direction and the cooling direction, in particular, a case in which the parallel rubbing method is employed and the cooling direction runs in the reverse direction of the rubbing direction.
Figure 17:
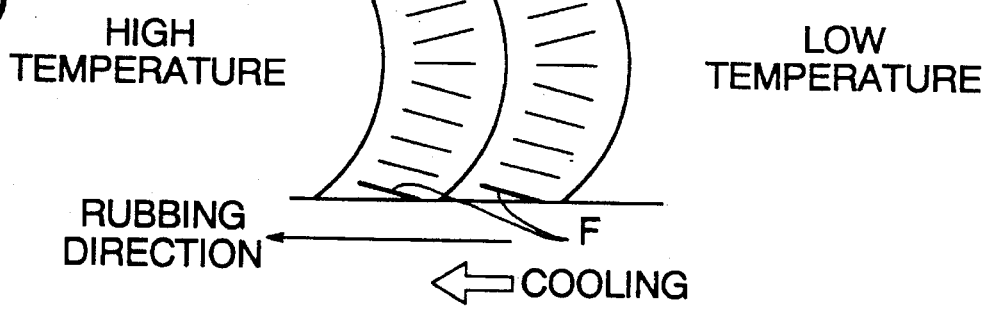
FIG. 17 is a view schematically illustrating the bending direction of the liquid crystal layer and the inclined state of the liquid crystal molecule relative to both the rubbing direction and the cooling direction, in particular, a case in which the parallel rubbing method is employed and the cooling direction runs in the same direction as the rubbing direction.

In either rubbing direction, the bending direction of liquid crystal layers in the chevron structure directed toward the end portion where cooling started. In the case of the parallel rubbing condition (Table 1(a),(b):FIGS. 16 and 17), in particular, when the cooling direction was set to the same as the rubbing direction (Table 1(b):FIG. 17), slight zigzag defects and tree-shaped defects were observed. When the cooling direction was set opposite to the rubbing direction (Table 1(a):FIG. 16), any abnormal alignment was not observed. This is because the mutual interaction between the liquid crystal and the orientation film prefers the state of Table 1(a):FIG. 16, and further, because the state of Table 1(a): FIG. 16 allows the movements of molecules to be more smoothly achieved. Also in the case of the state of Table 1(b):FIG. 17, if the moving direction of the boundary plane reversed, new defect-free orientations were obtained. In either case of FIGS. 16 and 17, abnormal orientations were present at the places within about 5 through 10 mm from the inlet/outlet of the liquid crystal of barrier members 8.

Figure 20:
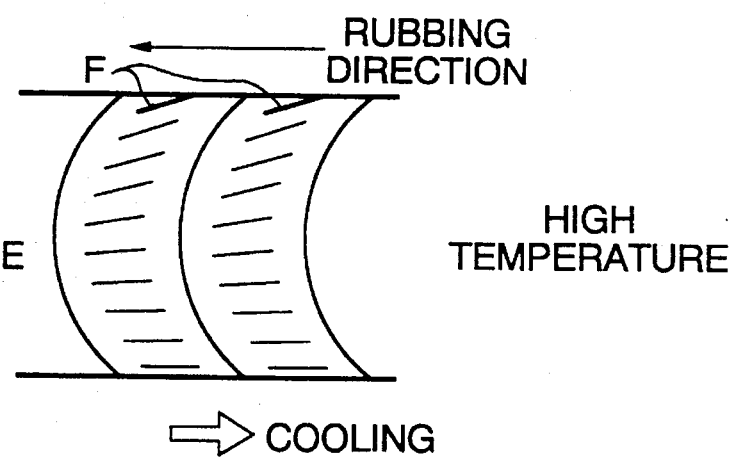
FIG. 20 is a view schematically illustrating the bending direction of the liquid crystal layer and the inclined state of the liquid crystal molecule relative to both the rubbing direction and the cooling direction, in particular, a case in which the either side rubbing method is employed and the cooling direction runs in the reverse direction opposite to the rubbing direction.
Figure 21:
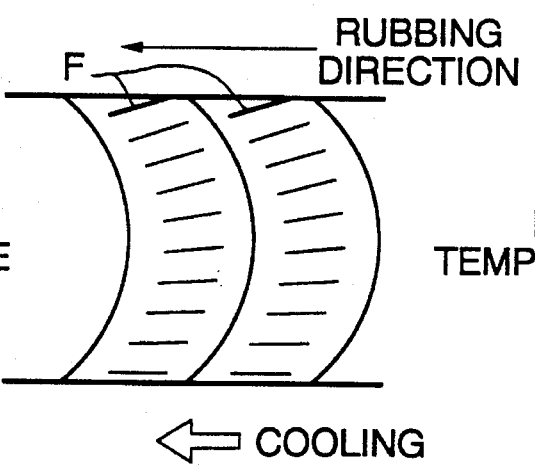
FIG. 21 is a view schematically illustrating the bending direction of the liquid crystal and the inclined state of the liquid crystal molecule relative to both the rubbing direction and the cooling direction, in particular, a case in which the either side rubbing method is employed and the cooling direction runs in the same direction as the rubbing direction.

Further, a similar result was obtained in the case of the either one side rubbing condition (Table 1(e),(f): FIGS. 20 and 21).

Figure 18:
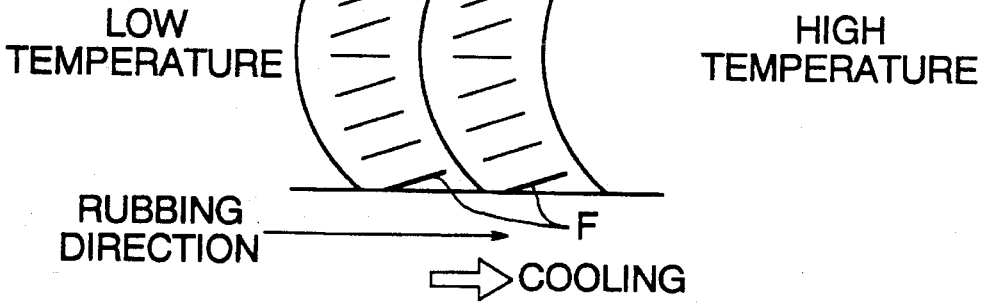
FIG. 18 is a view schematically illustrating the bending direction of the liquid crystal layer and the inclined state of the liquid crystal molecule relative to both the rubbing direction and the cooling direction, in particular, a case in which the anti-parallel rubbing method is employed and the cooling direction runs in the same direction as the lower side rubbing.
Figure 19:
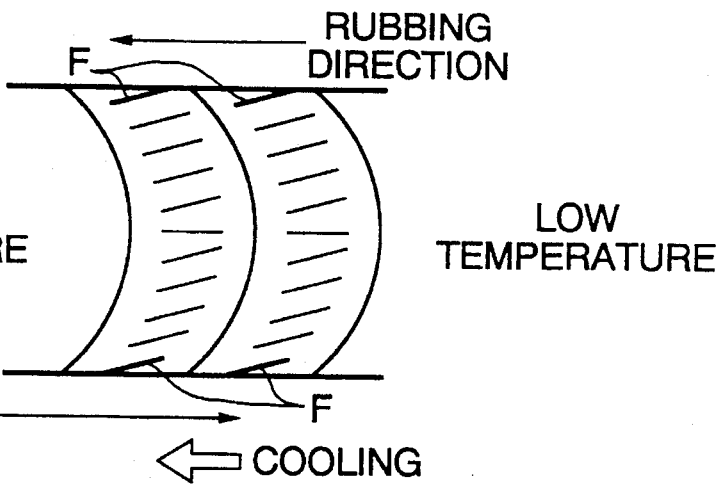
FIG. 19 is a view schematically illustrating the bending direction of the liquid crystal layer and the inclined state of the liquid crystal molecule relative to both the rubbing direction and the cooling direction, in particular, a case in which the anti-parallel rubbing method is employed and the cooling direction runs in the same direction as the upper side rubbing direction.

In the case of the anti-parallel rubbing condition in which rubbing directions differ between upper and lower substrates (Table 1(c)(d):FIGS. 18 and 19), there may be no distinction in the bending direction of the liquid crystal layer. Nevertheless, in fact, defect-free orientations were obtained only when the liquid crystal panel was cooled down from either one side, or even if there were a few alignment defects if any, that amount was extremely small. This is considered that since barrier members were formed on orientation films by photolithography, the action of orientation films became asymmetrical with respect the upper and lower sides. If the symmetry of the action of orientation films is maintained by making barrier members by printing, defect-free orientated state will be obtained even if cooled from any one of both sides. There are cases in which alignment defects may happen either by photolithography or by printing, but these results show that the bending direction of the liquid crystal layer can be freely reversed by selecting the cooling direction.

If the bending direction of the liquid crystal layer which is determined by the combination of the liquid crystal and the orientation film and that defined by cooling operation coincide with each other, then a perfect defect-free alignment can be obtained. Although also in the opposite case the defect-free alignment can occur, a slight zigzag defect, treeshaped and linear defects are found in an experiment.

Even if the temperature at which the movement of the boundary plane between the water and the atmospheric air is initiated was set to the temperature corresponding to the chiral nematic phase (75° C.) or the SmA phase (67° C.), similar defect-free orientations were obtained. These phases are obtained by gradually cooling the liquid crystal in the liquid from the isotropic phase at the rate of 0.2° C./min. However, when the moving speed of the boundary plane between the liquid and the atmospheric air was increased to above 5 cm/min, then the zigzag defects or tree-like defects were generated in the cases of (a),(c),(d) and (e) of Table 1.

When the liquid crystal panel assembly according to this example was cooled down in the oven or the aforesaid water tank from 85° C. down to the room temperature at the rate of 0.2° C./min, that is, when it was cooled down without imparting the temperature gradient, the entire liquid crystal within the panel frame was divided into a few major domains which differ in the bending directions of the liquid crystal layers, and the tree-like defects were found to scatter within those domains, never providing the defect-free orientation. With this liquid crystal panel assembly, even if the method of immersing the panel assembly or cooling condition was varied, the position of the abnormal alignment was only slightly shifted without achieving any correction of it.

Reference Example 1

A liquid crystal panel assembly of the same structure using the same materials and substrates as in the example 1 was made in which stripe-shaped barrier members were not adhered to the substrate. The stripe configuration of the barrier members 8 was formed similarly as that of the example 1 as shown in FIG. 2. After stripe-shaped barrier members were dried for one hour, a seal portion 21 was formed with epoxy resin by screen printing.

Both substrates were overlapped according to the same process as in the example 1, and then, the substrates were set to the device for pressing by the atmospheric air to hold at 90° C. Under this condition, both substrates were adhered with each other at the seal portion 21 to thereby obtain the liquid crystal panel frame. In this panel frame, barrier members 8 located in the neighborhood of the seal portion 21 were closely in contact with the substrate without being adhered, while barrier members 8 located in the central portion separated from the substrate. The liquid crystal was made to penetrate into the liquid crystal panel assembly so that it runs in substantially parallel to the rubbing direction. Subsequently, the panel assembly was immersed within the water tank having the same temperature as in the example 1 and was cooled down under the same condition as that of the example 1. As a result, despite the cooling direction, large and small zigzag defects scattered and the defect-free initial alignment could never be obtained.

Reference Example 2

A liquid crystal panel assembly, in which the configuration of the adherent material was of columnar form having a radius of 8 μm, was obtained according to a similar process as in the example 1. That is, both substrates were adhered to each other by means of the dot-shaped adherent member. Dot-shaped adherent members were disposed regularly at intervals of 5 mm on the line where stripe-shaped members were mounted in the example 1. The liquid crystal was made to penetrate into the panel frame so as to run in substantially parallel to the rubbing direction. Subsequently, the liquid crystal panel assembly was immersed in the water tank having the same temperature as in the example 1, and was cooled down under the same condition as in the example 1. As a result, regardless of the cooling direction, zigzag defects and tree-like defects were found, never providing the defect-free initial orientation.

Reference Example 3

A liquid crystal panel assembly was obtained according to a similar process as in the example 1. However, as a spacer corresponding to the barrier member, a spherical glass bead with a diameter of 2 μm was used. Then, the upper and lower substrates were not adhered. A liquid crystal panel assembly was formed by making the liquid crystal penetrate so that it runs in substantially parallel to the rubbing direction. Subsequently, that panel assembly was immersed in the water tank having the same temperature as in the example 1, and was cooled down under the same condition as in the example 1. With this panel assembly, the direction in which the liquid crystal contracts was not definitely fixed, and zigzag defects were generated around the glass beads used as the spacers, never achieving the defect-free initial orientation. In addition, it suffered a change of the cell gap caused by heating and cooling.

EXAMPLE 2

Four types of liquid crystal panel assemblies each making an angle of 90°, 40°, 23° and 12° between the stripe-shaped barrier member and the rubbing direction were made according to the same structure and the process as in the example 1. Cooling was conducted in the same manner as in the example 1. In the case having the angle of 90°, even if the boundary plane between the water and the atmospheric air was moved at any angle, a multiplicity of zigzag defects were generated normal to the barrier member. Since the liquid crystal of the liquid crystal panel assembly in which stripe-shaped barrier members and the rubbing direction run in substantially parallel to each other was completely defect-free, it was indicated that the amount of generated defects was continuously increased with an increase in inclination angle of the barrier member from 90° to substantially parallel.

Therefore, disposing barrier members so as to deviate from the direction parallel to the rubbing direction only causes the danger that the defects are generated, so that such an operation has practically no meaning. Incidentally, even when the inclination angle of the barrier member was 23°, though the number was small, quasi-linear defects were generated in parallel to the rubbing direction. This is considered to happen because the penetrating direction of the liquid crystal deviates from the rubbing direction and, for a more predominant reason, the movement of the liquid crystal, which is going to move along the rubbing direction, is prevented because the liquid crystal strikes against the barrier member.

With the barrier member having the inclination angle of 40°, a multiplicity of linear defects and, through in part, small defects were generated as compared with one having the inclination angle of 23°. With the barrier member having the inclination angle of 12°, defect-free orientated liquid crystal was obtained. Therefore, it is preferable that the angle formed with the barrier member and the rubbing direction be suppressed within the range of 12°.

EXAMPLE 3

A liquid crystal panel assembly was made according to the same structure and process as in the example 1. Several barrier members 8 were omitted to form two kinds of rectilinear spaces R1 and R2, the number of which respectively amounted to ten. Width "L" of apertures formed by adjacent barrier members 8 is set to about 1 mm for rectilinear spaces R1 and is set to about 2 mm for rectilinear spaces R2. The methods of making the liquid crystal penetrate and the cooling the same were conducted similarly to those of the example 1. In the case that the liquid crystal made to penetrate through the rectilinear space R2 having the width "L" of 2 mm, though their number was small, zigzag defects and linear defects were generated, while the liquid crystal penetrated into the rectilinear space R1 having the width "L" of 1 mm did not contained any alignment defects. As a result, it can be understood that the width of aperture formed between adjacent stripe-shaped barrier members should be narrower. However, an appropriate width of the aperture formed by barrier members may be selected depending on the panel size, pixel size, positioning of the color filters, adhesion strength, resistance to pressure and the like. Further, if this panel assembly is to be used as a medium for optical writing, the aperture width is selected according to the scanning pitch of laser beams for writing or the like.

EXAMPLE 4

Figure 25:
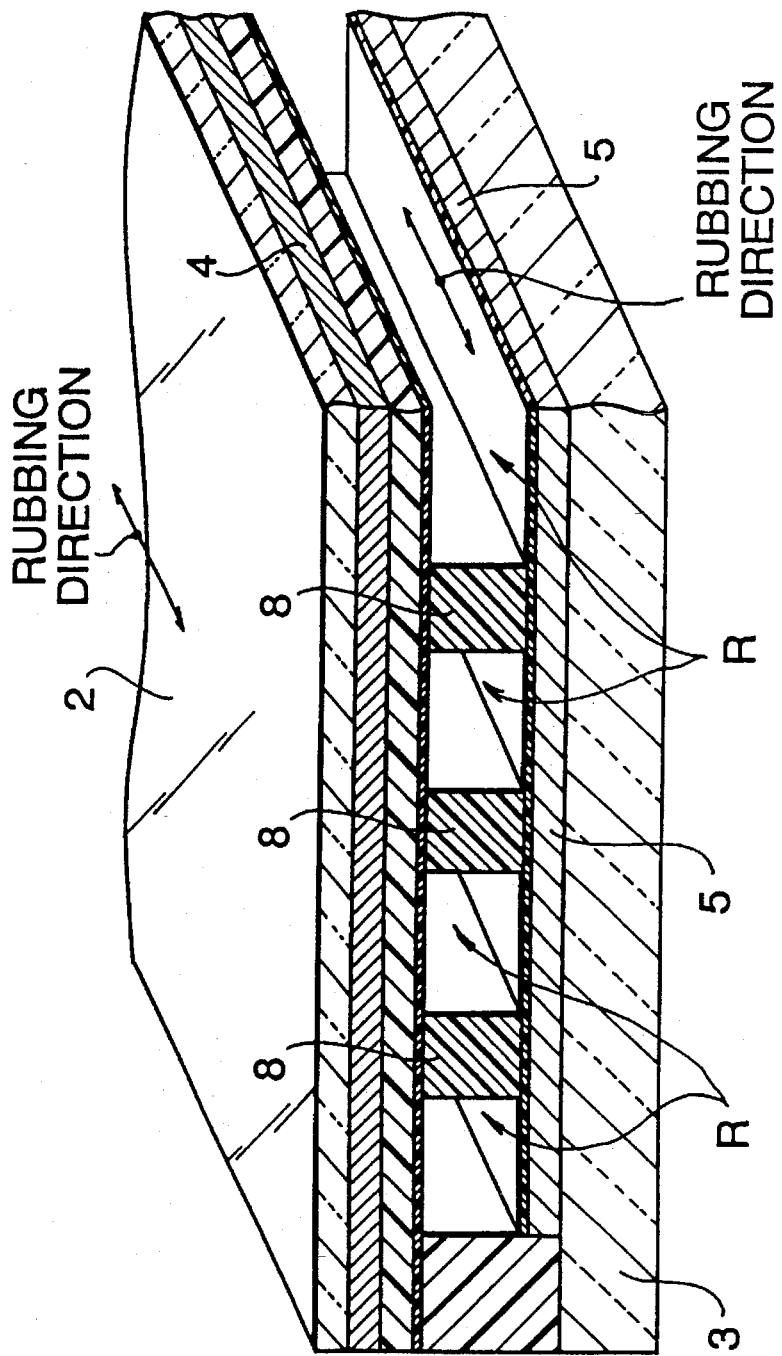
FIG. 25 is a perspective cross-sectional view illustrating another embodiment of the internal structure of the liquid crystal panel assembly according to the present invention.
Figure 26:
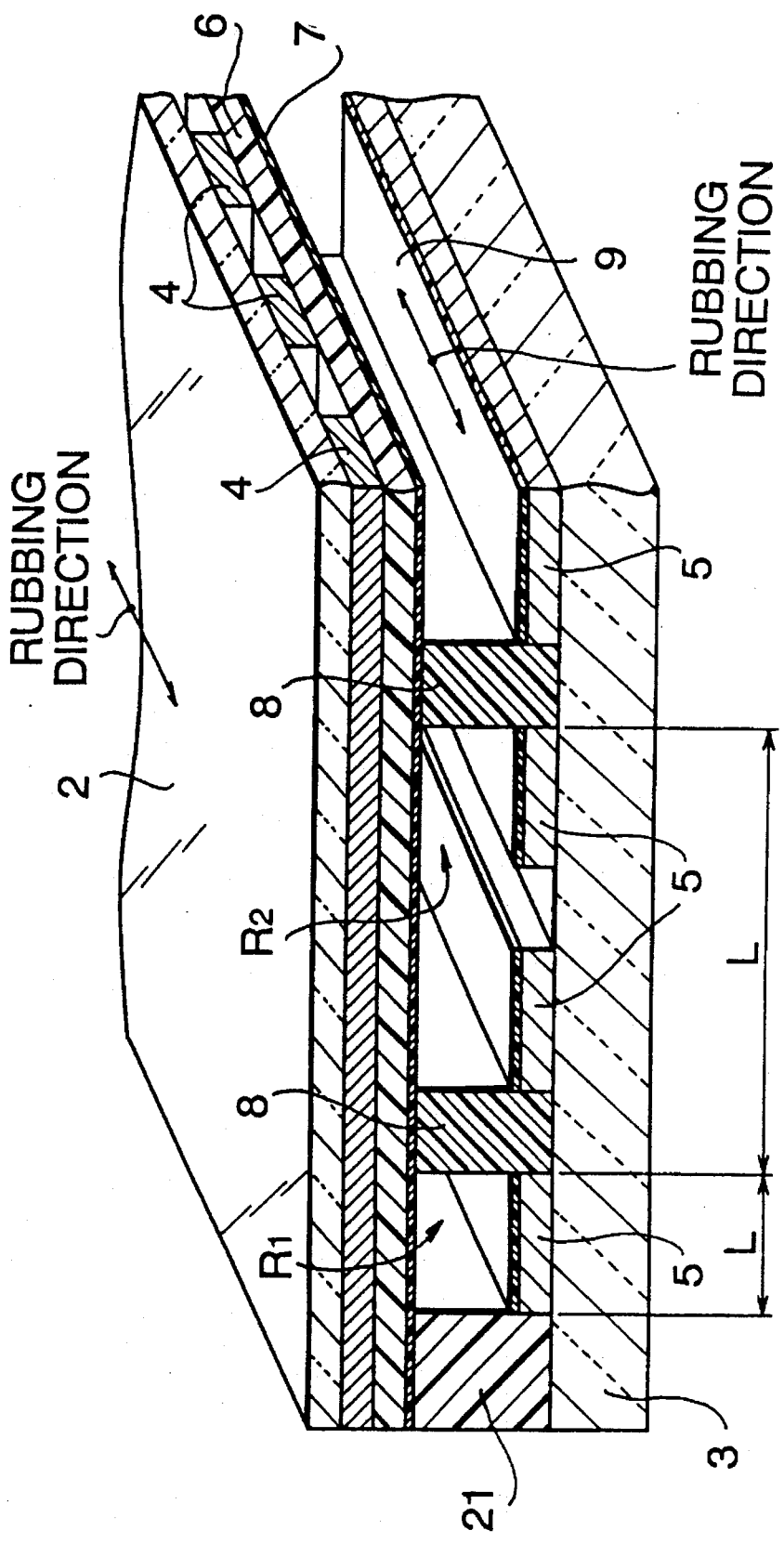
FIG. 26 is a perspective cross-sectional view illustrating a still another embodiment of the internal structure of the liquid crystal panel assembly according to the present invention.
Figure 27:
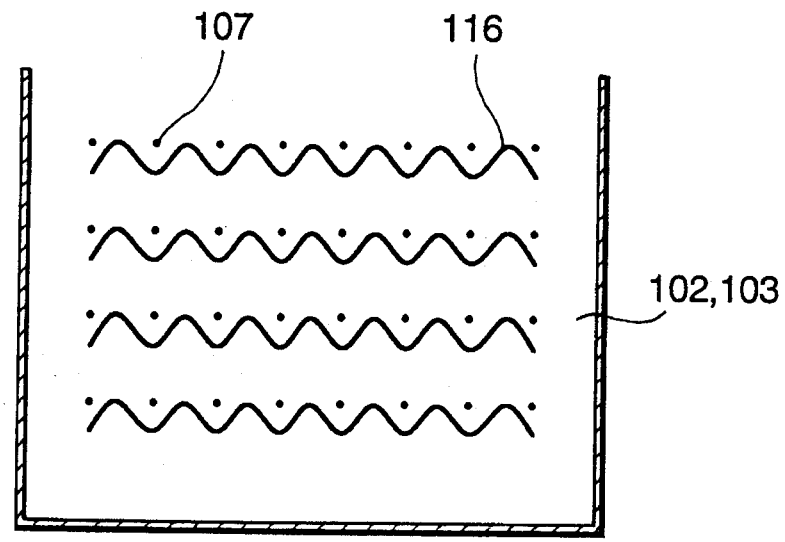
FIG. 27 is a view schematically illustrating a specific embodiment of how the zigzag defects appear in the conventional liquid crystal panel assembly.
Figure 28:
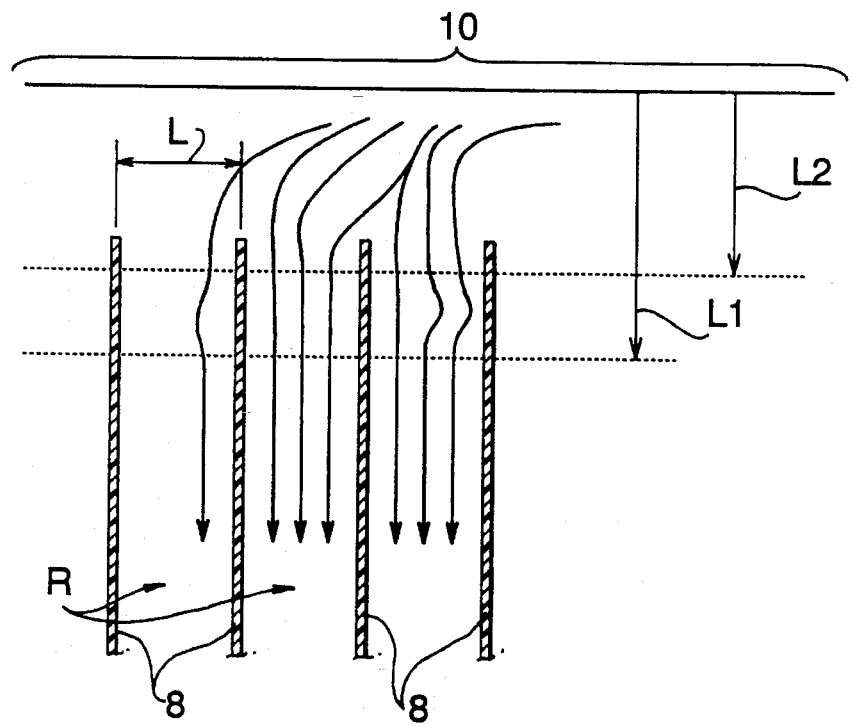
FIG. 28 is a view schematically illustrating the flow of the liquid crystal in the neighborhood of the inlet/outlet of the rectilinear space.
Figure 29:
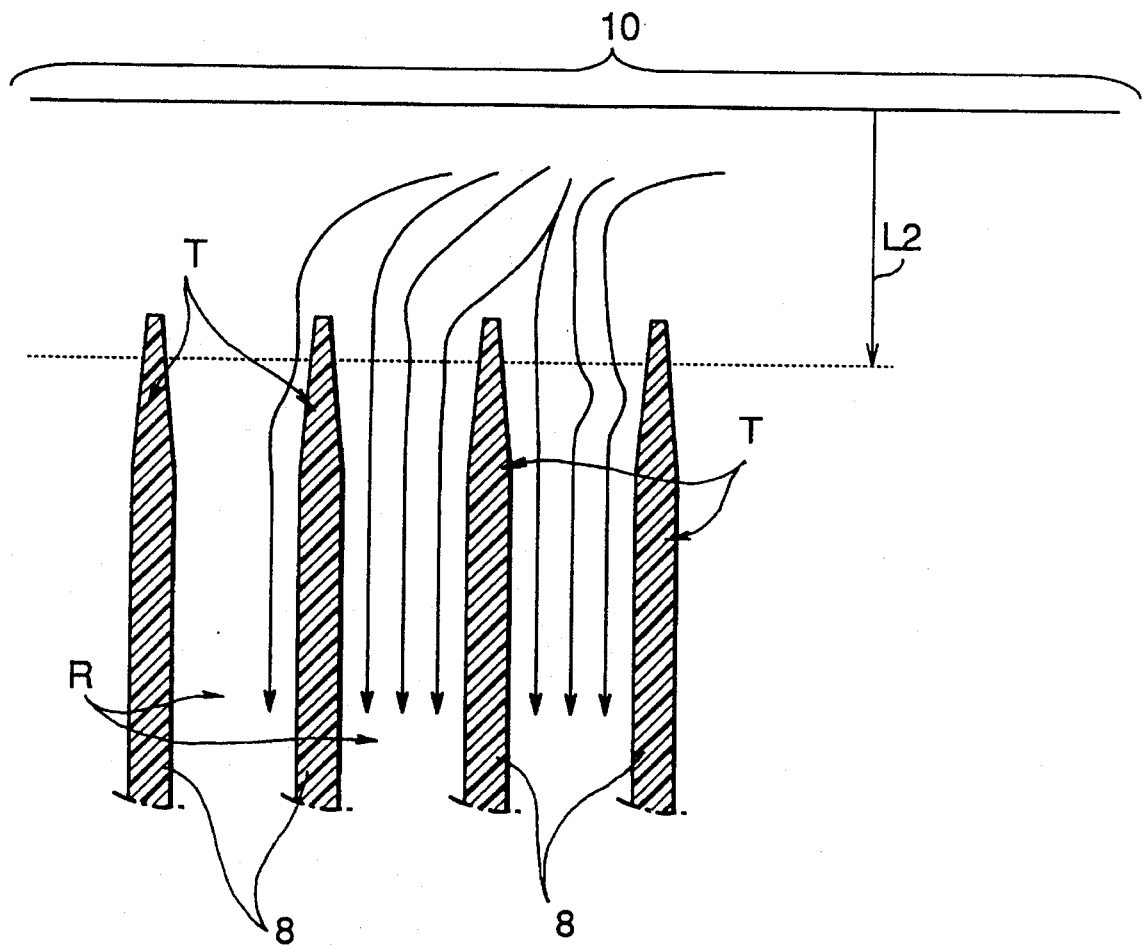
FIG. 29 is a view illustrating a modified embodiment of a barrier member.
Figure 30:
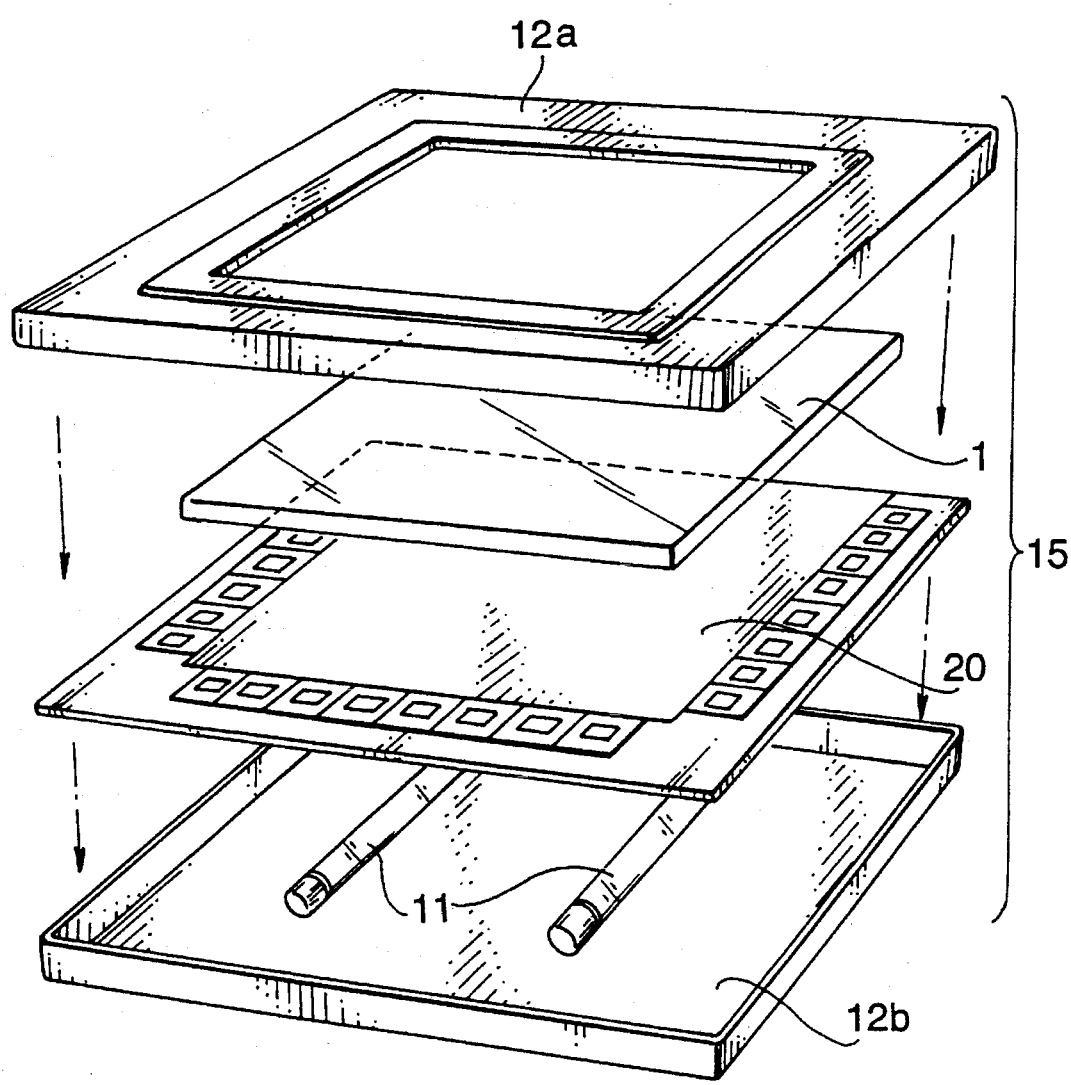
FIG. 30 is an exploded perspective view of a specific embodiment of the liquid crystal display.
Figure 31:
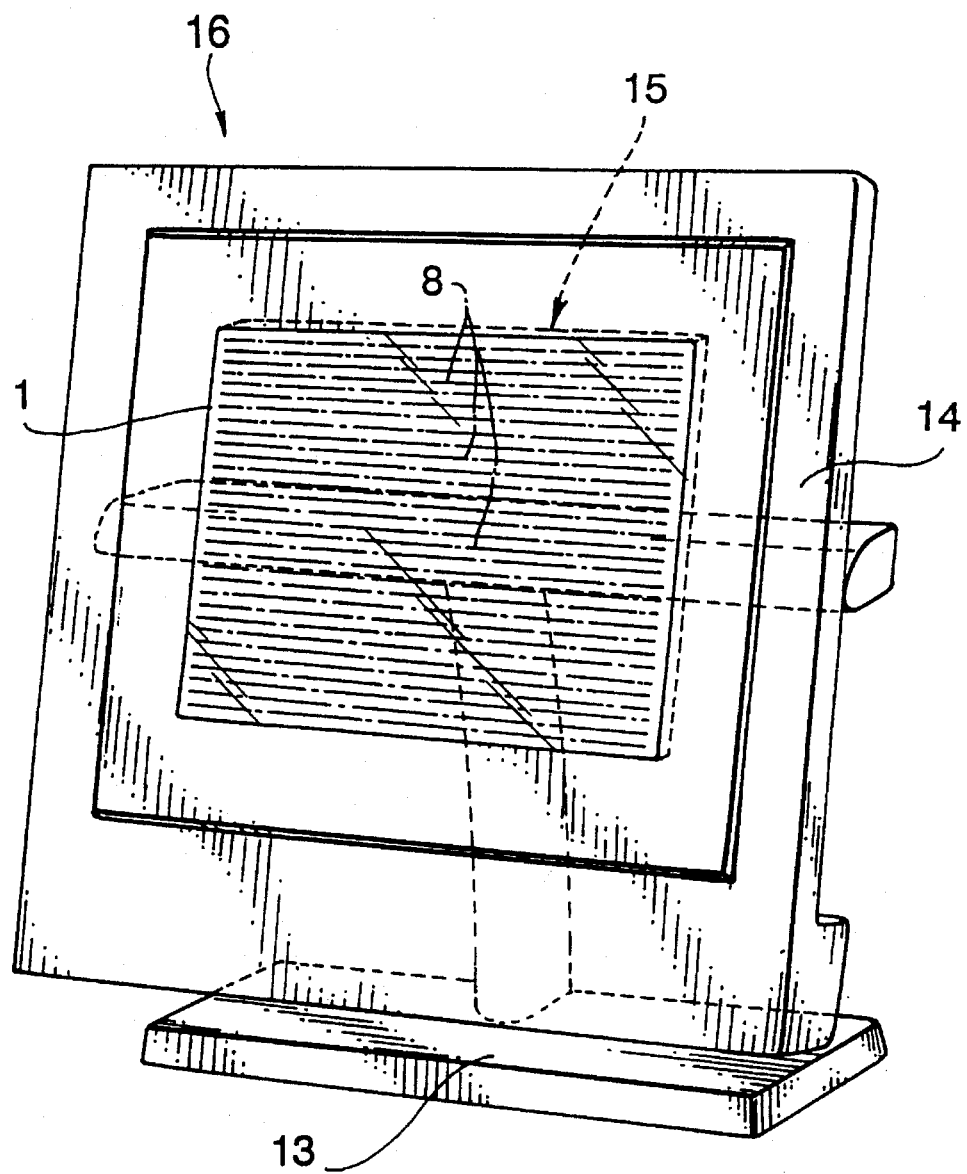
FIG. 31 is a perspective view illustrating a specific example of how the liquid crystal display is used.

Referring to FIG. 25, a set of transparent substrate 2, 3 surface flatness of which is machined within 2 μm is prepared. Those substrates 2, 3 are produced by optically polished a glass plate having a size of 45 cm×45 cm and 1.1 mm in thickness. ITO film having a thickness of 2000 angstrom was coated by sputtering on the substrates 2, 3 to form planar electrodes 4, 5.

Subsequently, after solution of 2% polyimide resin HL1110 was spin coated on the substrate 3 for 20 sec at the rate of 1000 rpm, the substrate 3 was dried for about one hour in the oven with a temperature of 180°, and was subjected to the rubbing process at the room temperature in parallel to its side edge. Further, in order to disperse particulate rigid pieces into barrier members 8, solution of 30 cp viscosity of the resin series resist OMR-83 (commercially available from Tokyo Applied Chemistry Inc), in which spherical spacers were added to the resin 1% by weight, was spin coated on the substrate for 15 sec at the rate of 3000 rpm.

Thereafter, adherent barrier members 8 having a pattern shown in FIG. 2 was formed on the substrate 2 according to the well-known photolithography so that it runs in parallel to the rubbing direction. With this barrier member 8, its thickness was set to 2.2 μm, the length to 37 cm and the number to 900. Main difference from the example 1 lies in the length of rectilinear spaces "R" formed. The area "D" (see FIG. 2) available as the display portion results in 37 cm×30 cm. After a solution of 2% polyimide resin HL1110 was spin

31 coated on the opposed substrate 2 for 20 sec. at the rate of 1000 rpm, the substrate 2 was dried for about one hour within the oven having a temperature of 180° C.

As in the example 1, a liquid crystal panel frame, in which the rubbing directions of the upper and lower substrates 2, 3 run in parallel to each other and in the same direction was obtained. The panel frame had no depression at the central portion thereof and the cell gap of about 2.0 μm and comprised a group of barrier members between the upper and lower substrates which were fixedly adhered. Further, ferroelectric liquid crystal ZL13774 (commercially available from Merc Inc.) were encapsulated in this liquid crystal panel assembly. This liquid crystal undergoes a phase transition in series comprising the liquid phase—86° C.—the N* phase—76° C. the SmA phase—62° C.—the SmC* phase.

After the liquid crystal panel assembly was immersed and held for three minutes in the water tank whose temperature was controlled to 88° C. and the entire liquid crystal was turned into the liquid phase, water held in the water tank was drained so that the boundary plane between the water and the atmospheric air was lowered at the rate of 2.5 cm/min. When the liquid crystal panel assembly was sequentially cooled down in the cooling direction illustrated in FIG. 17, any alignment defect was not found at the main portion of the assembly. When the cooling direction was reversed, only a few zigzag and tree-shaped defects were found. According to the combination of the orientation film and the liquid crystal layer in this liquid crystal panel assembly of this example, the liquid crystal layer typically bends in the direction opposite to that of the example 1. There was abnormal orientations including the zigzag defects on the order of 10 mm at the initial and terminal end portions of barrier members.

This panel assembly was cooled down to the room temperature at the rate of 0.2° C./min while being kept entirely immersed in the liquid, and being controlled the temperature so that the difference in temperature over the entire panel surface is within the range of 0.1° C. As a result, zigzag defects emerged across adherent members at the position where the entire panel surface was divided into the ratio of 1:2 for the upper and lower halves respectively. A multiplicity of linear defects was found within the two liquid crystal phase domains which caused the zigzag defects at their boundary. When cooling was conducted by changing the method of immersing the liquid crystal panel assembly, the positions of the zigzag defects were displaced, but did not disappear. This shows that the distribution of the cooling points and the movement of the molecules during the reduction of volume were the cause of generating defects.

Reference Example 4

A liquid panel frame was made according to a similar process as in the example 1. However, the size of the glass substrate used was 10 cm×10 cm, and the area available as the display portion was 8 cm×8 cm. The ferroelectric liquid crystal ZL13774 (commercially available from Merc Inc) was encapsulated in this panel frame similarly as in the example 3. After the completion of encapsulation, a similar process as in the example 3 was conducted, with a result that the zigzag defects happened because a sufficient temperature gradient could not be realized.

EXAMPLE 5

A liquid crystal panel frame for encapsulating liquid crystal was made according to a similar method as in the example 1. The ferroelectric liquid crystal CS1014 (com-

Figure 23:
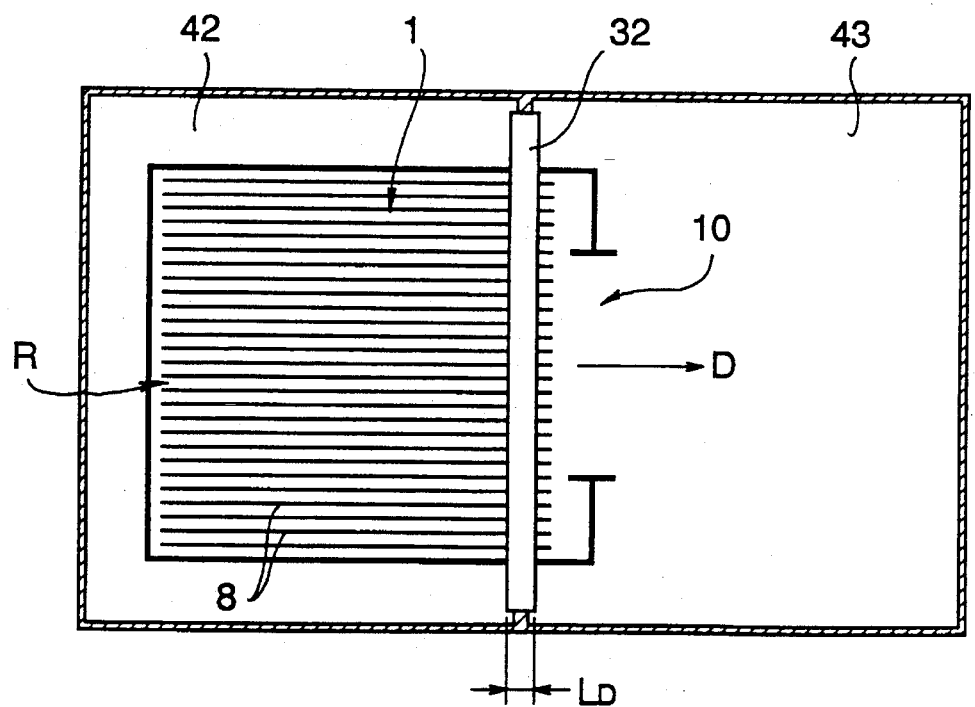
FIG. 23 is a view schematically illustrating another embodiment of the apparatus for manufacturing the liquid crystal panel assembly according to the present invention.

32 mercially available from Chisso Inc) was encapsulated. FIG. 23 illustrates an arrangement of the apparatus used in practice in its entirety. In order to set the phase which lies is higher temperature than the chiral smectic C phase to the chiral nematic phase, the higher side of temperatures which form the temperature gradient was set to 75° C. As regards the atmosphere for controlling the temperature of the panel frame, the atmosphere 42 which serves as a high temperature portion and having a temperature higher than the temperature corresponding to the chiral smectic C phase was chosen to be dry air, while the atmosphere 43 which serves as a low temperature portion and having a temperature corresponding to the chiral smectic C phase was also chosen to be dry air. The moving speed of the temperature gradient was set to 1 cm/min. The numeral 32 denotes a heat insulating member having the length LD of 10 cm along the direction of the temperature gradient.

When the liquid crystal panel assembly 1 was moved, in the direction of an arrow "D", relative to the temperature gradient formed by the high and low temperature portions 42, 43, a liquid crystal panel assembly 1 having a completely defect-free chiral smectic C phase was obtained.

EXAMPLE 6

Figure 24:
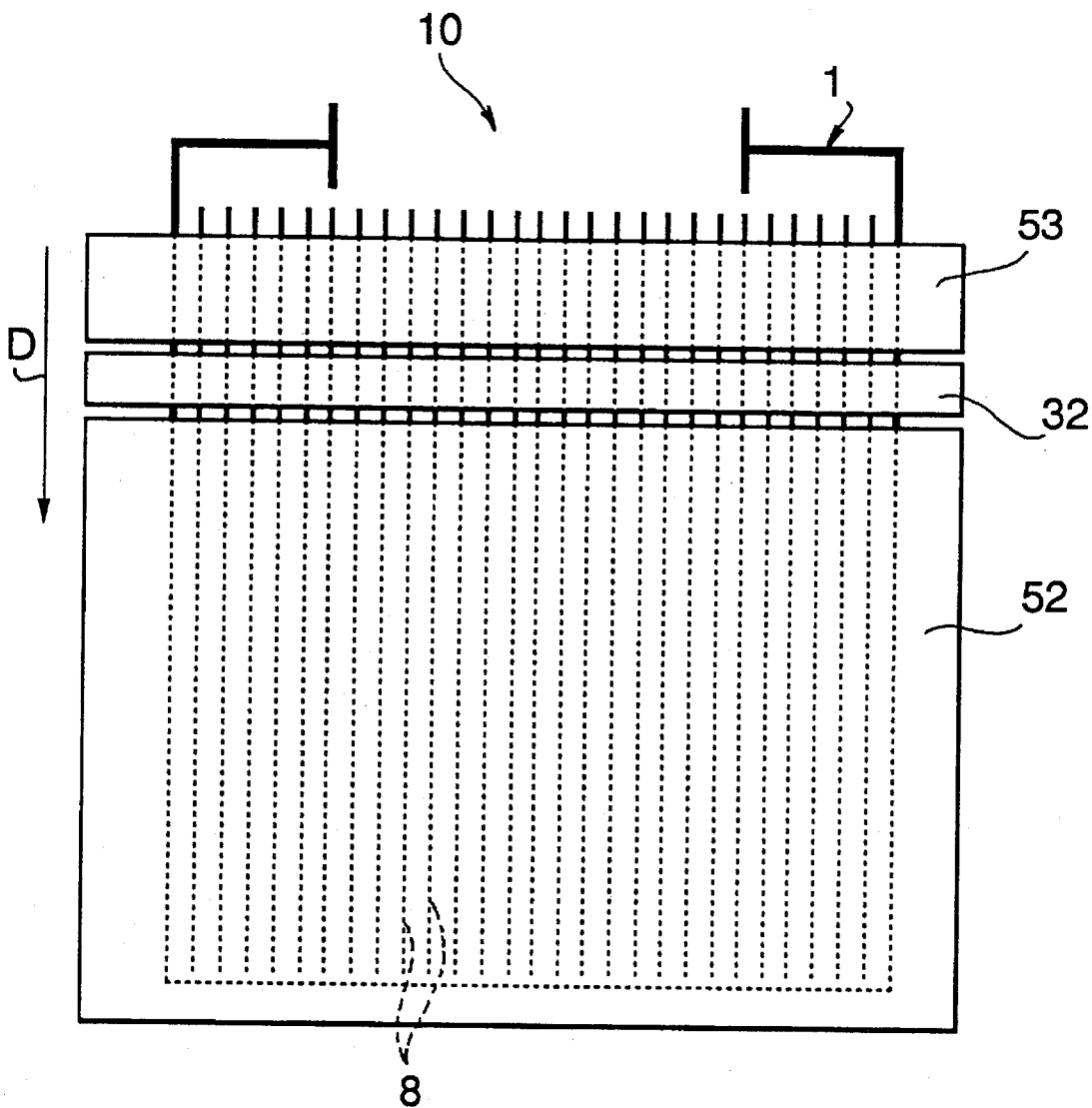
FIG. 24 is a view schematically illustrating a still another embodiment of the apparatus for manufacturing the liquid crystal panel assembly according to the present invention.

A liquid crystal panel frame for encapsulating liquid crystal was made according to a similar process as in the example 1. The ferroelectric liquid crystal CS1014 (commercially available from Chisso Inc) was encapsulated in the panel frame. FIG. 24 illustrates an arrangement of an apparatus used in practice in its entirety.

In order to set the phase which lies in higher temperature than the chiral smectic C phase to the smectic A phase, the higher side of temperatures which form the temperature gradient was set to 65° C. Temperature adjusting apparatuses 52, 53 making the Peltier element contact with an object to heat or cool the same, that is, a solid temperature adjusting means was used as a means for controlling the temperature. The adjustment of the temperature by these apparatuses 52, 53 is possible in the range from a temperature corresponding to the chiral smectic C phase up to the temperature corresponding to the isotropic phase. Both the temperature higher than the temperature corresponding to the chiral smectic C phase, namely, the high temperature portion and the temperature corresponding to the chiral smectic C phase, namely, the low temperature portion were realized by these temperature adjusting apparatuses 52, 53. The moving speed of the temperature gradient was set to 1 cm/min. The numeral 32 denotes a heat insulating member.

When the liquid crystal panel assembly 1 was moved in the direction of an arrow "D" relative to the temperature gradient formed by the high temperature portion 52 and the low temperature portion 53, a liquid crystal panel assembly having a defect-free chiral smectic C phase was obtained.

Reference Example 5

A liquid crystal panel frame for encapsulating liquid crystal was made according to a similar process as in the example 1. The ferroelectric liquid crystal CS1014 (commercially available from Chisso Inc) were encapsulated in the panel frame. In order to set the phase which lies in higher temperature than the chiral smectic C phase to the chiral nematic phase, the higher side of temperatures which form the temperature gradient was set to 75° C. As regards the atmosphere for controlling the temperature, the atmosphere having a temperature higher than the temperature corresponding to the chiral smectic C phase was set to the water, while the atmosphere having a temperature corresponding to the chiral smectic C phase was set to the atmospheric air. However, no heat insulating member was provided at the portion of the temperature gradient. The moving speed of the temperature gradient was set to 2.5 cm/min.

As a result, the temperature gradient was not definitely formed because of the fluctuation of temperature caused by vapor, so that the contracting direction of the liquid crystal was not defined. Consequently, the zigzag defects were generated in the corrugated form in alignment with the movement of the temperature gradient.

EXAMPLE 7

A liquid crystal panel frame for encapsulating liquid crystal having the same structure as in the example 1 was made according to the same process as in the example 1. The anti-ferroelectric liquid crystal CS4000 (commercially available from Chisso Inc) was encapsulated in the panel frame to make a liquid crystal panel assembly. The same materials as in the example 1 were employed as the other materials necessary for producing the panel frame. The liquid crystal CS 4000 having the anti-ferroelectric phase undergoes phase transitions in series comprising the isotropic phase, namely, the liquid phase—101° C.—the smectic A phase84° C.—the chiral smectic C phase—82° C.—the chiral smectic CA phase. After this liquid crystal panel assembly was covered with a protective sheet made of synthetic resin and was immersed in silicon oil having a temperature of 105° C., the temperature gradient was formed relative to the liquid crystal panel assembly under the same condition as in the example 1, and the boundary plane between the water and the atmospheric air was shifted in parallel to the rubbing direction. It is in order to prevent the silicon oil from adhering to the liquid crystal panel assembly, which makes it difficult to handle the panel assembly, that the assembly is covered with the protective sheet.

In the case of this example, even if the liquid crystal panel assembly was cooled down from either side, no major difference was found in the resulting orientated order, and in either case, thin and long zigzag defects were found. However, as compared with one in which the liquid crystal panel assembly was cooled down while being immersed in the silicon oil without providing the temperature gradient, the number of alignment defects was small, that is, the aligning capability was by far superior.

EXAMPLE 8

A liquid crystal panel frame for encapsulating liquid crystal having the same structure as in the example 1 was made according to the same process as in the example 1. However, after the adherent member was formed, an aqueous solution of 10% polyvinyl alcohol was spin coated for 40 sec at the rate of 1000 rpm to form the orientation film and then, the substrate was dried for 30 minutes at the temperature of 120° C. The same polyvinyl alcohol film was formed on the opposed substrate, and was subjected to the rubbing process. Then, both substrates were made to stick so that the rubbing direction becomes substantially parallel to barrier members to make a liquid crystal panel assembly. When the panel assembly was cooled down under the same condition as in the example 1, a defect-freely alignment order was obtained even if cooled from either side.

EXAMPLE 9

A liquid crystal panel frame for encapsulating liquid crystal having the same structure as in the example 1 was made according to the same process as in the example 1. However, barrier members was tapered so that the 5 mm long portions of that initiating and terminating portions are smoothly narrowed toward the top end. An organic pigment of color index No. 7 the particle size of which was below 0.3 μm, and dispersing materials were dispersed in barrier members. When the same liquid crystal as in the example 1 was encapsulated and was cooled under the same condition as in the example 1, the area at the inlet/outlet of the liquid crystal where the alignment was abnormal was reduced to 4 mm in maximum. Even if the pigment or dispersing material was dispersed within barrier members, the adhesive performance was maintained and a liquid crystal panel assembly which was excellent in light screening property was obtained.

EXAMPLE 10

The same liquid crystal panel assembly as in the example 4 was made. However, the terminal end portion 23 of barrier members (FIG. 2) were made to adhere to the seal portion 21. At the terminal end portion, there were abnormal alignment orders within the range of about 7 through 10 mm. When the liquid crystal panel assembly was left at rest for about 10 days so that stripe-shaped barrier members extend in the longitudinal direction relative to visual sensation, the lower area where the alignment was abnormal was increased about 7 through 8 mm to come to a standstill reaching an equilibrium. Such an abnormal alignment is considered to be because the gravitational force acting on the liquid crystal within the rectilinear space was added to the lower area of the liquid crystals.

From the foregoing, it can be seen that when the liquid crystal display was placed in the normal using condition, if barrier members 8 within the liquid crystal panel assembly is set to extend in the horizontal direction, the gravitational force acting on the liquid crystals lying within the rectilinear space is received by each barrier member 8 to thereby prevent the abnormal alignment from occurring to the liquid crystals lying below the liquid crystal panel assembly.

EXAMPLE 11

Combinations of the liquid crystal and the polyimide for the alignment were as follows, which allowed perfectly defect-free alignment to be achieved by properly selecting the high temperature phase and the cooling direction according to the same process as in the examples 1 and 4.

Ferroelectric Liquid Crystal:

CS1013, CS1015, CS1017, CS1019, CS1024 (commercially available from Chisso Inc)

ZL13774, ZL13775 (Merc Inc)

SCE8, SCE9, SCE10, SCE11 (commercially available from BDH Inc)

Polyimide Resin:

S610 (commercially available from Nissan Chemistry Inc)

PIQ1400, PIQ5200 (commercially available from Hitachi Kasei Inc)

AL3046, AL1051 (commercially available from Nihon Gohsei Gomu Inc)

EXAMPLE 12

Figure 32:
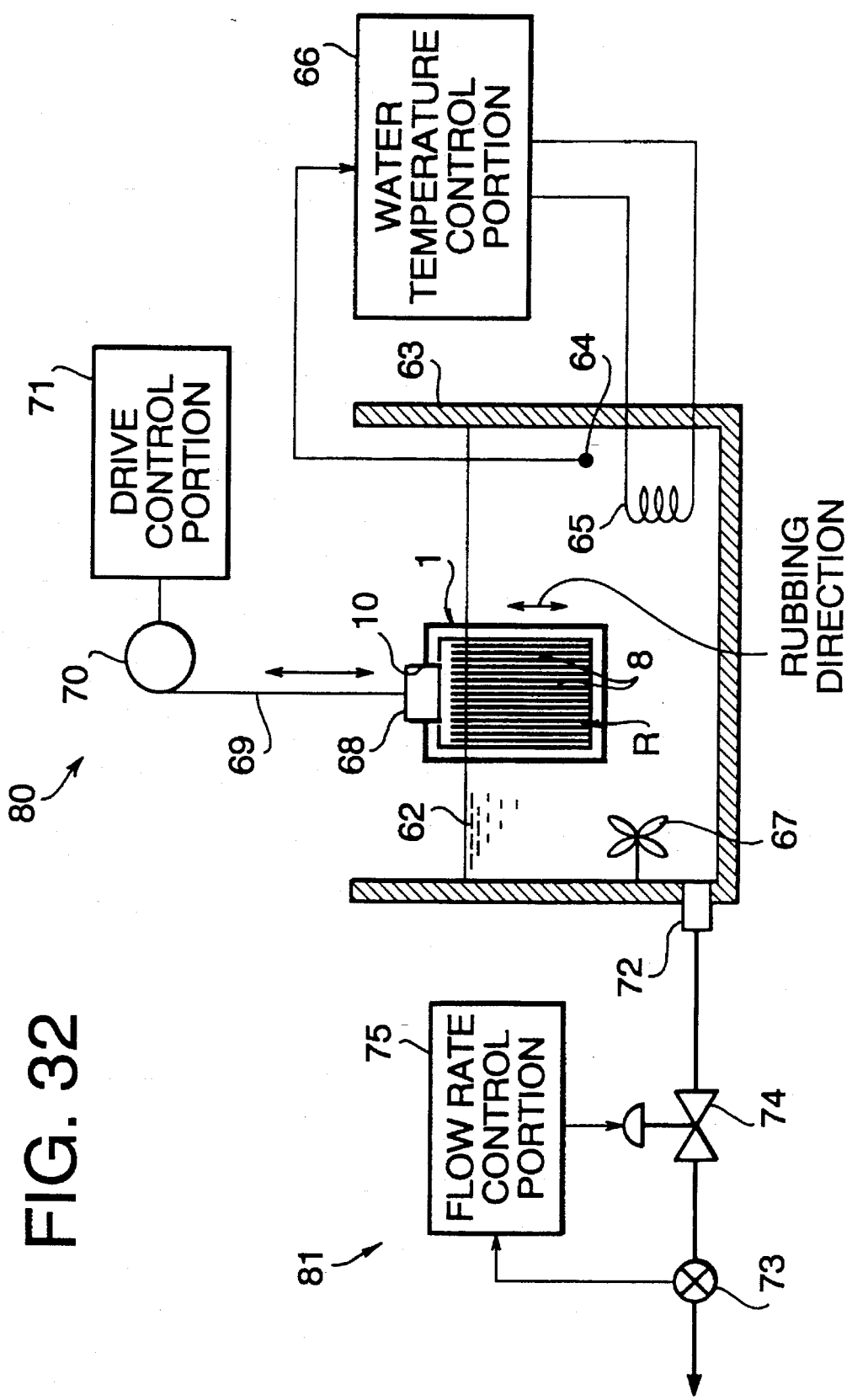
FIG. 32 is a view illustrating another embodiment of the apparatus for manufacturing the liquid crystal panel assembly according to the present invention.

FIG. 32 illustrates a specific example of the apparatus for manufacturing the liquid crystal panel assembly. This apparatus comprises a circulating constant-temperature bath 63 accommodating water 62 acting as the high temperature portion, an lifting apparatus 80 for vertically shifting a liquid crystal panel assembly relative to the bath 63 and a water level control unit 81 for controlling the water level of the water 62 within the bath 63. The lifting apparatus 80 and the level control unit 81 each act as an apparatus for controlling the position of the boundary plane between the water and the atmospheric air relative to the liquid crystal panel assembly 1.

The circulating constant-temperature bath 63 comprise a fan 67 for agitating water 62, a sensor 64 for sensing the water temperature and a heater 65 for elevating the water temperature by heating water 62. The output signal of the water temperature sensor 64 is sent to a water temperature control portion 66, which in turn controls the current supply to the heater 65 based on that signal. Incidentally, the temperature at which the liquid crystal panel assembly is started to be pulled up is set to one enough for the liquid crystal within the liquid crystal panel assembly to present the chiral nematic phase and which is close to the temperature transient to the smectic phase. For the liquid crystal exhibiting no chiral nematic phase, the water temperature is set to one at the lower side within the range of the temperature at which that liquid crystal exhibits a liquid state.

The lifting apparatus 80 for vertically shifting the liquid crystal panel assembly is provided upwardly of the bath 63, and comprises a pulley 70 about which a string 69 having a panel grasping portion 68 at the top end for grasping or opening the liquid crystal panel assembly 1 and a drive control portion 71 for vertically driving the pulley 70. The pull-up speed of the pulley 70 by the drive control portion 71, and hence, of the liquid crystal panel assembly 1 may be selected as desired depending on the difference in temperature between the water and the gas, or on the length of the liquid crystal panel assembly taken in the pulling-up direction, but if the difference is about 30° C., 3 cm/min will be enough.

The water level control apparatus 81 comprises a flowrate sensor 73 for sensing the flowrate of water which flows out of a water outlet 72 formed through the bath 63 and a control valve 74 for controlling the flowrate of water. A flowrate control potion 75, upon receipt of the output signal of the flowrate sensor 73, controls opening/closing of the control valve 74 so that a desired amount of water may flow.

The operation of the foregoing apparatus is hereinafter described. First, the temperature of water 62 within the circulating constant-temperature bath 63 is held to 30° C., and the liquid crystal panel assembly 1 is immersed into the water 62 so that its rubbing direction runs in substantially parallel to the pulling-up direction. However, the aperture 10 of the liquid crystal panel assembly for encapsulating liquid crystal and its neighborhood are not immersed within the water 62. The ferroelectric liquid crystal CS1014 (commercially available from Chisso Inc) are encapsulated within the liquid crystal panel assembly 1.

The bath 63 elevates the water temperature gradually up to 82° C. according to a predetermined temperature elevating program, which lies in the neighborhood of the lowest temperature within a range in which the liquid crystal encapsulated within the panel assembly 1 presents the isotropic phase. That temperature is held for 30 minutes, and then, is lowered down to 71° C, which lies in the neighborhood of the lowest temperature within a range in which that crystal presents the chiral nematic phase. Then, the temperature of the water is maintained at 71° C.

Thirty minutes after the water temperature is held to 71° C., the drive control portion 71 of the lifting apparatus 80 controls the pulley 70 for drive and starts to pull up the liquid crystal panel assembly 1. The pull-up speed remains constant at, for example, 3 cm/min, from the beginning of the pull up operation to the completion of it.

In the liquid crystal panel assembly 1, a temperature gradient is formed between the portion where it is exposed into the air and the portion where it is immersed into the water. As the panel assembly is pulled up, the boundary plane between the water and the air having the temperature gradient is gradually shifted in the rubbing direction. As a result, as shown in FIG. 14(a), the contracting direction of the liquid crystal during the precipitation of the chiral smectic phase can be restricted only to the gas side, that is, the low temperature side in the pull-up direction, making it correspond to the orientated force of the orientation film. Thus, since the local disturbance of the orientating force is blocked, a large monodomain layer presenting the chiral smectic phase can be formed and, in fact, a liquid crystal panel assembly which is completely defect-free could be obtained.

Incidentally, even if the boundary plane between the water and the air is lowered at the rate of 3 cm/minute using the water level control unit 81 without using the unit 80 for vertically shifting the liquid crystal panel assembly, it is also possible to obtain the monodomain layer presenting the chiral smectic phase. Further, even if the units 80 and 81 are simultaneously used, when the shifting speed of the boundary plane between the water and the air set to 3 cm/min, the monodomain layer presenting the chiral smectic phase can similarly be obtained.

As described above, the liquid crystal is changed into the chiral nematic phase at the side higher than the chiral smectic phase by the action of the circulating constant-temperature bath 63, and the boundary plane relative to the liquid crystal panel assembly is gradually shifted in substantially parallel to the rubbing direction by the action of the units 80, 81 to make the contracting direction of the liquid crystal correspond to the orientating force of the orientation film. As a result, a large area monodomain layer which is free from the zigzag defects, that is, a defect-free orientated chiral smectic phase can be obtained.

Further, in this example, since a plurality of rectilinear spaces "R" is formed in parallel to the rubbing direction by means of a plurality of barrier members and the liquid crystal is divided and accommodated therein, the contracting direction of the liquid crystal is restricted, and yet the liquid crystal lying within different rectilinear spaces "R" are partitioned by barrier members 8 without interfering with each other. As a result, even with the large area liquid crystal panel assembly, generation of the zigzag defects can completely be blocked.

Further, in this example, since the boundary plane between the liquid and the air is shifted precisely relative to the liquid crystal panel assembly by only using the lifting unit 80 and the level control unit 81, it is useful from the industrial point of view. If the plurality of liquid crystal panel assemblies 1 are immersed within a large circulating constant-temperature bath 63, the boundary plane between the water and the air can simultaneously be lowered relative to each liquid crystal panel assembly 1 by means of the water level control unit 81. In such a case, high productivity can be achieved.

Incidentally, oil or silicon oil can also be used as the high temperature portion in place of the water 62. If oil or the like is used, it is desirable to cover the liquid crystal panel assembly 1 with, for example, a protective sheet, in order to prevent handling of the panel assembly from becoming difficult by adhesion of oil or the like, to thereby indirectly heat it. Upon using water 62 as the high or low temperature portion, it is desirable to provide a heat insulating member at the boundary plane between the water and the air in order to block formation of dew or temperature elevation of the panel assembly due to vapor.

What is claimed is:

1. Liquid crystal panel frame comprising:
   a pair of substrates at least one of which is transparent and composed of glass;
   a pair of electrodes each formed on said substrates so as to oppose each other;
   a plurality of rectilinear barrier members which are provided between both substrates and which are arrayed in parallel to each other at predetermined intervals; and
   an orientation film formed on at least one of said substrates and to which an uniaxial alignment treatment is applied;
   each barrier member extending in substantially in parallel to the direction in which the uniaxial alignment treatment is carried out; and
   each barrier member being composed of photosensitive resin and adhered to the opposed substrates so that portions other than an aperture formed at end portion thereof through which the liquid crystal passes form a rectilinear space sealed against liquid.

2. Liquid crystal panel assembly comprising:
   a pair of substrates at least one of which is transparent and composed of glass;
   a pair of electrodes each formed on said substrates so as to oppose each other;
   a plurality of rectilinear barrier members which are provided between both substrates and which are arrayed in parallel to each other at predetermined intervals; and
   an orientation film formed on at least one of said substrates and to which the uniaxial alignment treatment is applied;
   each barrier member extending in substantially in parallel to the direction in which the uniaxial alignment treatment is carried out;
   each barrier member being Composed of photosensitive resin and adhered to the opposed substrates so that portions other than an aperture formed at end portion thereof through which the liquid passes form a rectilinear space sealed against liquid; and
   ferroelectric liquid crystal or anti-ferroelectric liquid crystal being encapsulated in each rectilinear space.

3. Liquid crystal panel assembly as claimed in claim 2, wherein said uniaxial alignment treatment comprises a rubbing process or an oblique vapor deposition process.

4. Liquid crystal panel assembly as claimed in claim 2, wherein said pair of electrodes comprise a pair of stripe-shaped electrodes formed by arraying a plurality of rectilinear electrodes at predetermined intervals,
   said pair of stripe-shaped electrodes being each opposed;
   said pair of stripe-shaped electrodes intersecting at a right angle with each other;
   said barrier members being located between adjacent stripe-shaped electrodes and extending rectilinearly at the same interval as that of said stripe-shaped electrodes or at a plurality of intervals between said stripe-shaped electrodes.

5. Liquid crystal panel assembly as claimed in claim 2, wherein said pair of electrodes are planar electrodes;
   said barrier members being formed on one of said planar electrodes at an appropriate interval.

6. Liquid crystal panel assembly as claimed in claim 2, wherein the length of said rectilinear space is longer than that of the length of the area which is effectively used as the display portion.

7. Liquid crystal panel assembly as claimed in claim 2, wherein a black series coloring material is dispersed in said barrier members.

8. Liquid crystal panel assembly as claimed in claim 2, wherein a high molecular organic substance film is formed on the inner surface of rectilinear spaces.

9. Liquid crystal panel assembly as claimed in claim 2, wherein an aperture for conducting liquid crystals into the inside of a liquid crystal panel assembly is located at the side of the end potion of rectilinear spaces through which the liquid crystal pass.

10. Liquid crystal panel assembly as claimed in claim 2, wherein the phase of the ferroelectric liquid crystal is the chiral smectic C phase.

11. Liquid crystal display produced by fitting attachments to the liquid crystal panel assembly as claimed in claim 2, wherein said liquid crystal panel assembly is disposed so that the barrier members extends horizontally when said liquid crystal panel assembly being used.

12. Liquid crystal panel assembly comprising:
    a pair of substrates at least one of which is transparent;
    a pair of electrodes each formed on said substrates so as to oppose each other;
    a plurality of rectilinear barrier members which are provided between both substrates and which are arrayed in parallel to each other at predetermined intervals; and
    an orientation film formed on at least one of said substrates and to which the uniaxial alignment treatment is applied;
    each barrier member extending in substantially in parallel to the direction in which the uniaxial alignment treatment is carried out;
    each barrier member being adhered to the opposed substrate so that portions other than an aperture formed at end portion thereof through which the liquid passes form a rectilinear space sealed against liquid; and
    ferroelectric liquid crystal or anti-ferroelectric liquid crystal being encapsulated in each rectilinear space,
    wherein the phase of the anti-ferroelectric liquid crystal is either one of the chiral smectic CA phase, the chiral smectic C$\alpha$ phase, the chiral smectic C$\beta$ phase and the chiral smectic C$\gamma$ phase.

13. Liquid crystal panel assembly comprising:
    a pair of substrates at least one of which is transparent;
    a pair of electrodes each formed on said substrates so as to oppose each other;
    a plurality of rectilinear barrier members which are provided between both substrates and which are arrayed in parallel to each other at predetermined intervals; and
    an orientation film formed on at least one of said substrates and to which the uniaxial alignment treatment is applied;
    each barrier member extending in substantially in parallel to the direction in which the uniaxial alignment treatment is carried out;

each barrier member being adhered to the opposed substrate so that portions other than an aperture formed at end portion thereof through which the liquid passes form a rectilinear space sealed against liquid; and ferroelectric liquid crystal or anti-ferroelectric liquid crystal being encapsulated in each rectilinear space, wherein said barrier members have a taper at the end portion thereof which serves as an inlet or an outlet for conducting the liquid crystal; said taper becoming gradually thinner toward the outside.

14. Liquid crystal panel assembly comprising;

a pair of substrates at least one of which is transparent;

a pair of electrodes each formed on said substrates so as to oppose each other;

a plurality of rectilinear barrier members which are provided between both substrates and which are arrayed in parallel to each other at predetermined intervals; and an orientation film formed on at least one of said substrates and to which the uniaxial alignment treatment is applied;

each barrier member extending in substantially in parallel to the direction in which the uniaxial alignment treatment is carried out;

each barrier member being adhered to the opposed substrate so that portions other than an aperture formed at end portion thereof through which the liquid passes form a rectilinear space sealed against liquid; and ferroelectric liquid crystal or anti-ferroelectric liquid crystal being encapsulated in each rectilinear space, wherein rigid pieces are dispersed in said barrier members.

15. Method of manufacturing a liquid crystal panel assembly, comprising the steps of:

(1) forming an orientation film on at least one of a pair of substrates opposed to each other;

(2) applying an uniaxial alignment treatment to at least one of said orientation films;

(3) forming a plurality of rectilinear spaces being continuously in parallel with each other between said substrates so as to extend in substantially parallel to the direction of said uniaxial alignment treatment, said rectilinear spaces each having an aperture at least one end thereof, portions other than said aperture being sealed against liquid;

(4) encapsulating ferroelectric liquid crystal or anti-ferroelectric liquid crystal in said rectilinear spaces;

(5) retaining the encapsulated liquid crystal to the temperature corresponding to the high temperature phase; and (6) sequentially cooling the encapsulated liquid crystal from one end of said rectilinear spaces to the other end, from the temperature corresponding to the high temperature phase to the temperature corresponding to the low temperature phase, under the condition in which the temperature gradient is kept appearing along the direction of said uniaxial alignment treatment.

16. Method of manufacturing a liquid crystal panel assembly as claimed in claim 15, wherein the cross-section of said rectilinear spaces is of flat and substantially quadrangular form, its cross-sectional area is 0.006 mm$^2$ or less, and the length of said rectilinear spaces is 10 cm or more.

17. Method of manufacturing a liquid crystal panel assembly as claimed in claim 15, comprising the steps of:

(1) forming stripe-shaped electrodes on a pair of substrates, said strip-shaped electrodes being composed of a plurality of rectilinear electrodes arrayed at predetermined intervals;

(2) forming said orientation film on either or both of said stripe-shaped electrodes;

(3) applying said uniaxial alignment treatment to at least one of said orientation films;

(4) forming rectilinear barrier members between adjacent rectilinear electrode of said stripe-shaped electrodes mounted on the one of said substrates, at the same intervals as those for said rectilinear electrodes or at plural intervals, so as to extend in substantially parallel to the direction of said uniaxial alignment treatment; and (5) adhering said barrier members formed on one of said substrates to the other substrate to form rectilinear spaces sealed against liquid so that said stripe-shaped electrodes lying on said pair of substrates intersect with each other at a right angle.

18. Method of manufacturing a liquid crystal panel assembly as claimed in claim 15, comprising the steps of:

(1) forming planar electrodes on a pair of substrates;

(2) forming said orientation film on either or both of said planar electrodes;

(3) applying said uniaxial alignment treatment to at least one of said orientation films;

(4) forming barrier members at desired intervals on the planar electrode mounted on one of said substrates so as to extend in substantially parallel to the direction of said uniaxial alignment treatment, and (5) adhering said barrier members formed on one of said substrates to the other substrate to form rectilinear spaces sealed against the liquid.

19. Method of manufacturing a liquid crystal panel assembly as claimed in claim 15, wherein said high temperature phase is either one of the isotropic phase, the chiral nematic phase or the chiral smectic A phase.

20. Method of manufacturing a liquid crystal panel assembly as claimed in claim 15, wherein said low temperature phase is the chiral smectic C phase or the anti-ferroelectric phase.

21. Apparatus for manufacturing a liquid crystal panel assembly in which:

(1) a plurality of rectilinear spaces is continuously formed in parallel between a pair of substrates opposed to each other, the rectilinear spaces having an aperture at least one end thereof and portions other than said aperture being sealed against liquid;

(2) an orientation film is formed on at least one of said substrates;

(3) an uniaxial alignment treatment is applied to at least one of said orientation films in substantially parallel to the direction along which said rectilinear spaces extend;

(4) ferroelectric or anti-ferroelectric liquid crystal is encapsulated into said rectilinear spaces;

this apparatus comprising:

a high temperature portion having the temperature at which the encapsulated liquid crystal exhibits the high temperature phase;

a low temperature portion having the temperature at which the encapsulated liquid crystal exhibits the low temperature phase; and a liquid crystal panel moving means for moving the temperature gradient relative to the liquid crystal panel assembly from one end of the rectilinear space toward the other end of the same, under the condition in which the temperature gradient is kept appearing along the direction of the uniaxial alignment treatment.

22. Apparatus for manufacturing a liquid crystal panel assembly as claimed in claim 21, wherein a heat insulating member is provided between the high temperature portion and the low temperature portion.

23. Apparatus for manufacturing a liquid crystal panel assembly as claimed in claim 21, wherein at least either one of the high temperature portion and the low temperature portion is the gaseous atmosphere.

24. Apparatus for manufacturing a liquid crystal panel assembly as claimed in claim 21, wherein at least either one of the high temperature portion and the low temperature portion is the liquid atmosphere.

25. Apparatus for manufacturing a liquid crystal panel assembly as claimed in claim 21, wherein at least either one of the high temperature portion and the low temperature portion is formed of a solid substance.

26. Apparatus for manufacturing a liquid crystal panel assembly as claimed in claim 21, comprising:

a liquid area acting as the high temperature portion;

an atmospheric air area acting as the low temperature portion;

a means for moving a boundary plane between the liquid and the atmospheric air relative to the liquid crystal panel assembly immersed in the liquid area; and a heat insulting member movable following the surface of the liquid area and provided with a slit through which the liquid crystal panel assembly can pass.

27. Apparatus for manufacturing a liquid crystal panel assembly as claimed in claim 21, wherein the high temperature phase is either one of the isotropic phase, the chiral nematic phase or the chiral smectic A phase.

28. Apparatus for manufacturing a liquid crystal panel assembly as claimed in claim 21, wherein the low temperature phase is the chiral smectic C phase or the anti-ferroelectric liquid crystal phase.

* * * * *